(12) United States Patent
Haseke et al.

(10) Patent No.: US 7,458,605 B2
(45) Date of Patent: *Dec. 2, 2008

(54) AIRBAG, AIRBAG SYSTEM AND VEHICLE

(75) Inventors: Masahiro Hasebe, Hikone (JP); Yukitoshi Narimoto, Omihachiman (JP)

(73) Assignee: Takata Corporation, Tokyo (JP)

( * ) Notice: Subject to any disclaimer, the term of this patent is extended or adjusted under 35 U.S.C. 154(b) by 408 days.

This patent is subject to a terminal disclaimer.

(21) Appl. No.: 10/771,370

(22) Filed: Feb. 5, 2004

(65) Prior Publication Data

US 2004/0195807 A1    Oct. 7, 2004

(30) Foreign Application Priority Data

Apr. 3, 2003 (JP) ............................ 2003-100516
Dec. 12, 2003 (JP) ............................ 2003-415189

(51) Int. Cl.
    *B60R 21/233*    (2006.01)
    *B60R 21/23*    (2006.01)

(52) U.S. Cl. ............... 280/729; 280/743.1; 280/743.2

(58) Field of Classification Search ............ 280/729, 280/743.1, 743.2

See application file for complete search history.

(56) References Cited

U.S. PATENT DOCUMENTS

| | | | |
|---|---|---|---|
| 3,792,873 A | | 2/1974 | Buchner et al. |
| 5,213,361 A | | 5/1993 | Satoh et al. |
| 5,934,701 A | | 8/1999 | Furukawa |
| 6,254,121 B1 | * | 7/2001 | Fowler et al. ............... 280/729 |
| 6,302,433 B1 | * | 10/2001 | Ellerbrok et al. ........... 280/729 |
| 6,371,509 B1 | * | 4/2002 | Ellerbrok et al. ........... 280/729 |
| 6,536,800 B2 | * | 3/2003 | Kumagai et al. ......... 280/743.1 |
| 6,598,903 B2 | * | 7/2003 | Okada et al. ............. 280/743.2 |
| 6,802,534 B2 | | 10/2004 | Neupert |
| 6,832,779 B2 | * | 12/2004 | Tajima et al. ............ 280/743.1 |
| 6,834,886 B2 | * | 12/2004 | Hasebe et al. ............ 280/743.1 |
| 6,969,086 B2 | * | 11/2005 | Hasebe et al. ............ 280/743.1 |
| 7,000,943 B2 | * | 2/2006 | Hasebe et al. ............... 280/729 |
| 7,073,818 B2 | * | 7/2006 | Hasebe ....................... 280/729 |
| 7,093,853 B2 | * | 8/2006 | Hasebe et al. ............ 280/743.1 |

(Continued)

FOREIGN PATENT DOCUMENTS

DE      198 60 804      7/2000

(Continued)

*Primary Examiner*—John Q. Nguyen
*Assistant Examiner*—George D. Spisich
(74) *Attorney, Agent, or Firm*—Manabu Kanesaka

(57) ABSTRACT

An airbag is inflated with gas ejected from an inflator disposed at a base-end thereof in a direction that a front end of the airbag moves away from the base-end of the airbag. The airbag includes a left half airbag to be inflated on a front left side of an occupant and a right half airbag to be inflated on a front right side of the occupant. The airbag is formed of an inner panel extending from a front end of the right half airbag to a front end of the left half airbag; a right outer panel forming an outer surface of the right half airbag; a left outer panel forming an outer surface of the left half airbag; and a base-end panel forming a base-end chamber. The gas from the inflator is supplied into the left and right half airbags through the base-end chamber.

18 Claims, 25 Drawing Sheets

U.S. PATENT DOCUMENTS

| | | |
|---|---|---|
| 2002/0030355 A1* | 3/2002 | Braunschadel ........... 280/743.2 |
| 2002/0084638 A1* | 7/2002 | Neupert .................. 280/743.1 |
| 2002/0135164 A1 | 9/2002 | Thomas |
| 2003/0030254 A1* | 2/2003 | Hasebe ....................... 280/729 |
| 2005/0098994 A1* | 5/2005 | Matsumura ............. 280/743.1 |

FOREIGN PATENT DOCUMENTS

| | | |
|---|---|---|
| EP | 1 364 838 | 5/2003 |
| FR | 2.131.070 | 11/1972 |
| GB | 1 462 125 | 1/1977 |
| GB | 2 265 118 | 9/1993 |
| JP | S47-2361 | 2/1972 |
| JP | U-S47-21783 | 7/1972 |
| JP | S47-30044 | 11/1972 |
| JP | S47-30045 | 11/1972 |
| JP | 49-23176 | 6/1974 |
| JP | 49023176 B | 6/1974 |
| JP | H03-32956 | 2/1991 |
| JP | U-H04-9349 | 1/1992 |
| JP | H04-55141 | 2/1992 |
| JP | H04-204644 | 7/1992 |
| JP | 4-292239 | 10/1992 |
| JP | H05-178146 | 7/1993 |
| JP | H07-285408 | 10/1995 |
| JP | 8-1692963 | 7/1996 |
| JP | 9-263203 | 10/1997 |
| JP | 10-001006 | 1/1998 |
| JP | 100719111 | 3/1998 |

* cited by examiner

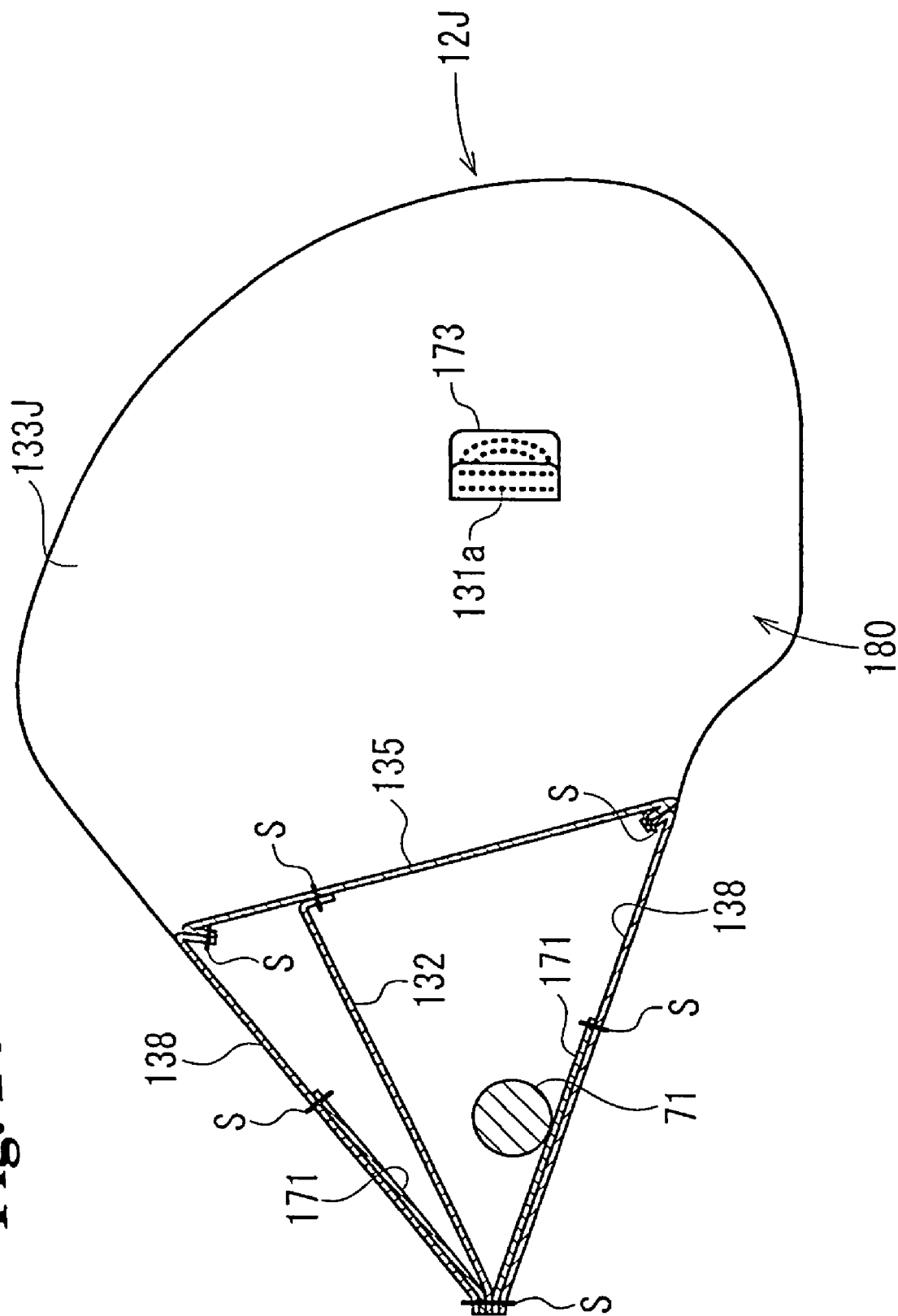

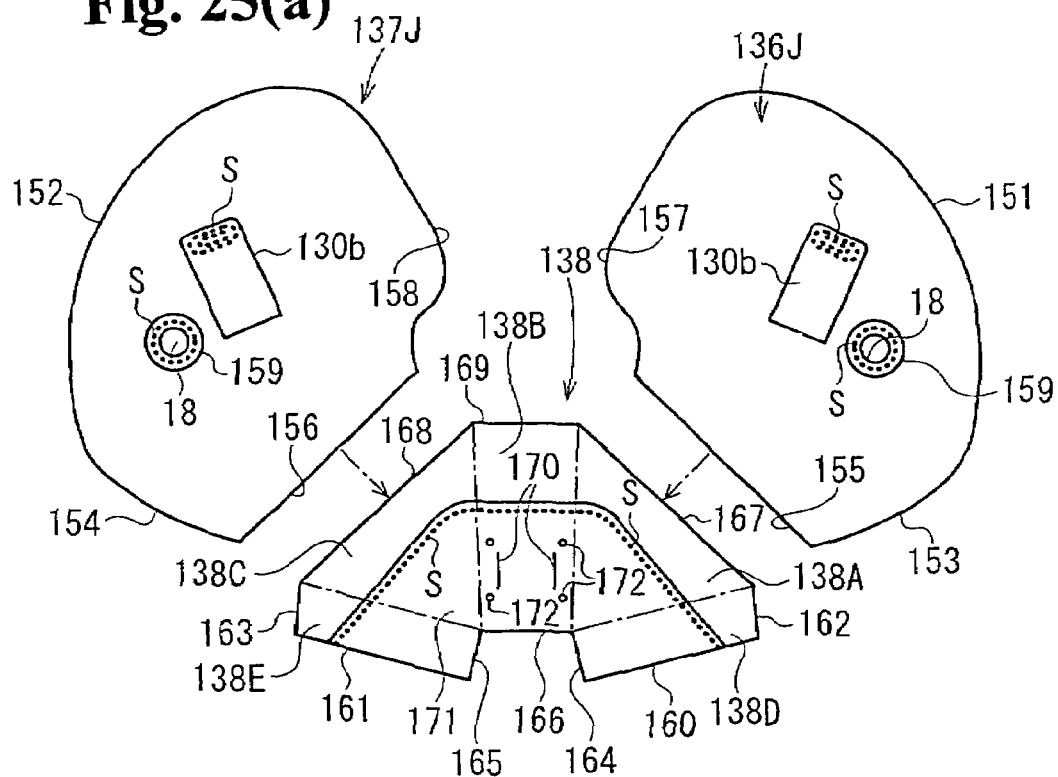
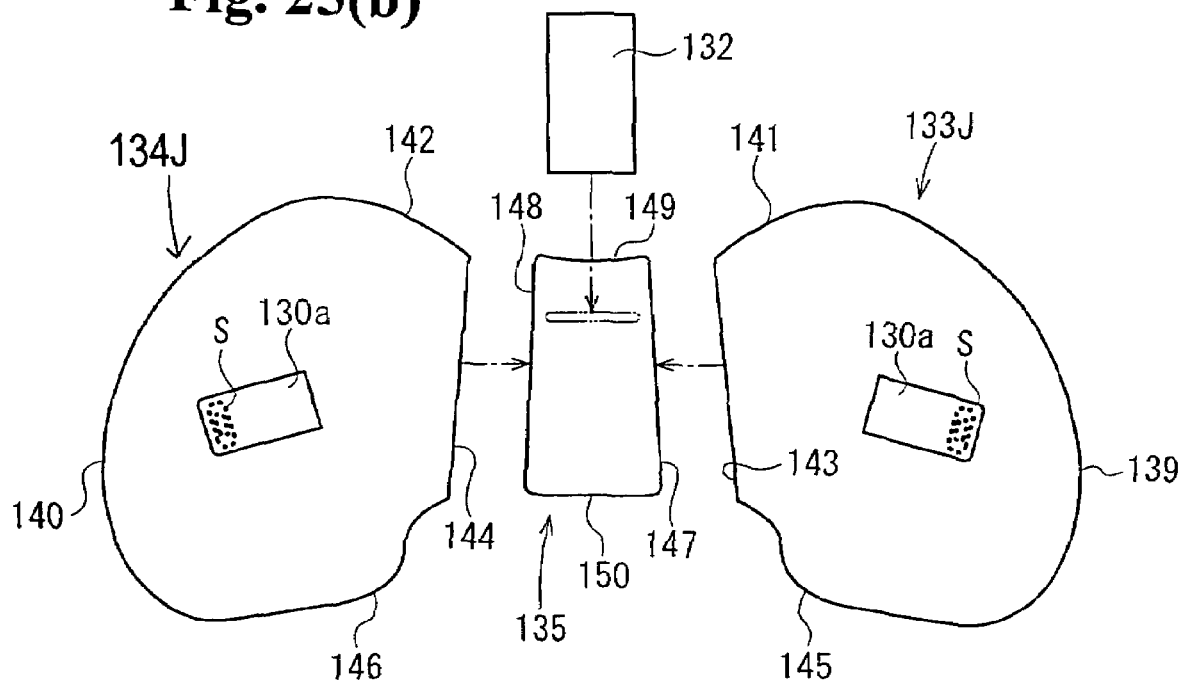

AIRBAG, AIRBAG SYSTEM AND VEHICLE

BACKGROUND OF THE INVENTION AND RELATED ART STATEMENT

The present invention relates to an airbag and an airbag system for protecting an occupant in case of a car crash and the like. More particularly, the present invention relates to an airbag and an airbag system including a left half airbag and a right half airbag to be inflated at a front left side and a front right side of an occupant, respectively. The present invention also relates to a vehicle provided with the airbag system.

Japanese Patent Publication (Kokai) No. 04-292239 has disclosed an airbag for protecting an occupant in case of a car crash and the like. The airbag includes a left half airbag and a right half airbag to be inflated by a common inflator on a front left side and a front right side of the occupant, respectively. In the airbag, front ends of the left half airbag and the right half airbag are joined together with a tie panel.

The airbag is housed in a casing in a folded state and covered with a cover. When the inflator (gas generator) is activated to eject gas in case of a car crash, the airbag pushes the cover to open, and is inflated in front of the occupant. The inflator is disposed inside or outside a base-end of the airbag. When an airbag system has the inflator outside the base-end of the airbag, the gas from the inflator is supplied into the airbag through a gas inlet at the base-end of the airbag. When the inflator is arranged inside the base-end of the airbag, an entire portion or a part of the inflator may be disposed in the airbag. The latter example includes a structure in which a pair of slit openings is provided in the airbag for inserting a rod-like inflator, and both ends of the inflator project to the exterior of the airbag.

In the airbag disclosed in Japanese Patent Publication (Kokai) No. 04-292239, the airbag is substantially formed of only the left half airbag and the right half airbag, and an interior thereof has two hollow chambers at left and right sides. When the left half airbag and the right half airbag are inflated, the gas from the inflator may flow into one of the half airbags more than that flowing into the other, and the one of the half airbags is inflated faster than the other of the half airbags. Also, the front ends of the left half airbag and the right half airbag are connected together with a tie panel. Accordingly, when the airbag is inflated, the tie panel receives a lateral center of the occupant body.

In view of the problems described above, the present invention has been made, and an object of the present invention is to provide an airbag and an airbag system having a base-end chamber connected to hollow chambers at left and right sides, in which the base chamber is inflated faster than the left and right half airbags.

Another object of the present invention is to provide an airbag and an airbag system in which both of the left half airbag and the right half airbag are inflated substantially equally.

A further object of the present invention is to provide an airbag and an airbag system in which the left half airbag receives a left thorax of the occupant and the right half airbag receives a right thorax of the occupant, and a space between the half airbags faces a lateral center of the thorax of the occupant, and to provide a vehicle provided with the airbag system.

Further objects and advantages of the invention will be apparent from the following description of the invention.

SUMMARY OF THE INVENTION

According to the present invention, an airbag is inflated with gas ejected from an inflator disposed at a base-end thereof in a direction that a front end thereof moves away from the base-end. The airbag includes a left half airbag to be inflated on a front left side of an occupant, and a right half airbag to be inflated on a front right side of the occupant. The airbag is formed of an inner panel extending from a front end of the right half airbag to a front end of the left half airbag through opposing surfaces of the right half airbag and the left half airbag; a right outer panel forming an outer surface of the right half airbag; a left outer panel forming an outer surface of the left half airbag; and a base-end panel forming the base-ends of the half airbags. The base-end panel forms a base-end chamber, and the gas from the inflator is supplied into the left half airbag and the right half airbag through the base-end chamber.

According to the present invention, upper rims of the left and right outer panels may be connected to an upper rim of the inner panel, and lower rims of the left and right outer panels may be connected to a lower rim of the inner panel. Front ends of the left and right outer panels may be connected to front ends of the inner panel, and the base-end panel may be connected to base-ends of the left and right outer panels and a base-end upper rim and a base-end lower rim of the inner panel.

According to the present invention, the airbag may further include a tether for connecting the base-end of the inner panel and the base of the base-end panel. The airbag may further include a connection panel for connecting the base-end of the left outer panel and the base-end of the right outer panel, and for dividing an interior of the left outer panel and an interior of the right outer panel from an interior of the base-end chamber. The connection panel and the tether may be integrated.

According to the present invention, the airbag may further include a gasbag in the base-end chamber for receiving the gas from the inflator. The gasbag includes an opening for discharging the gas from an interior thereof into the left airbag and the right airbag.

According to the present invention, distal ends of the left half airbag and the right half airbag may not be connected, and a space facing the occupant is formed between the distal ends of the left half airbag and the right half airbag when the airbag is inflated. A distance between the distal ends of the left half airbag and the right half airbag is preferably from 150 mm to 450 mm when the airbag is inflated. A horizontal distance from the distal ends to a deepest part of the space is preferably from 280 mm to 480 mm.

According to the present invention, an airbag device includes the airbag and an inflator for inflating the airbag. A vehicle includes an airbag system, in which the airbag system is a passenger airbag system mounted to an instrument panel of the vehicle. When the airbag is inflated, a rear end of the base-end chamber of the airbag is located closer to a front side of the vehicle than a rear end of the instrument panel in the front-to-rear direction of the vehicle.

In the invention, when the inflator is activated, the base-end chamber is inflated first, and then the left and right half airbags are inflated. The base-end chamber contacts a component of the vehicle such as an instrument panel to be in a stable position, so that the left and right half airbags are stabilized during the inflation as well as after completion of the inflation. The gas is supplied into the left half airbag and the right half airbag from the base-end chamber. Accordingly, even if the inflator ejects the gas more into one of the half airbags, the gas is supplied to the half airbags substantially evenly to inflate the half airbags substantially equally. The airbag is formed of the inner panel, the left and right outer panels, and the base-end panel, thereby making it easy to produce. An additional panel may be provided as necessity.

In the present invention, the left and right outer panels are connected to the inner panel at the upper rims thereof. The left and right outer panels are connected to the inner panel at the lower rims thereof. The left and right outer panels are connected to the inner panel at the front ends thereof. The base-end panel is connected to the base-end rims of the left and right outer panels, and the rear portions of the base-end upper rim and the base-end lower rim of the inner panel. Accordingly, it is easy to connect the airbags by stitching.

In the present invention, the airbag may further include a tether for connecting the rear end of the inner panel and a rear portion of the base-end panel, so that the base-end of the inner panel is situated at a predetermined position during the inflation. Also, the rear end of the inner panel is situated at a position close to the base-end of the airbag. When the rear end of the inner panel is situated at a position close to the base-end of the airbag, a pocket (space) between the left half airbag and the right half airbag becomes deep.

In the present invention, the airbag may further include the connection panel for connecting the base-end portion of the left outer panel and the base-end portion of the right outer panel, and for dividing the interiors of the left and right half airbags relative to the base-end chamber. Accordingly, it is possible to inflate the base-end chamber quickly and stabilize the airbag in the early stage of the inflation. It is also possible to equally supply the gas into the left half airbag and the right half airbag from the base-end chamber. The connection panel may be integrated with the tether, thereby making a process of producing the airbag simple.

In the invention, the airbag may further include the gasbag in the base-end chamber for receiving the gas from the inflator. The gasbag includes an opening for discharging the gas from an interior thereof into the left half airbag and the right half airbag, respectively. Accordingly, it is possible to equally supply the gas into the left half airbag and the right half airbag.

In the present invention, the left half airbag and the right half airbag are spaced at the distal ends thereof. The space with a pocket shape facing the occupant is formed between the distal ends of the left half airbag and the right half airbag when the airbag is inflated.

In the invention, when the airbag is inflated, the left half airbag receives a left thorax of the occupant and the right half airbag receives a right thorax of the occupant. The thorax portion has hard strong ribs. The airbag receives and absorbs an impact to the occupant through the ribs. The airbag has the space with the pocket shape between the front ends of the left half airbag and the right half airbag in the inflated state. The space faces a vicinity of breastbones of the occupant at the center thereof. Accordingly, when the body of the occupant plunges into the airbag, the vicinity of the breastbones does not receive a large reaction force of the airbag, thereby decreasing a load on the breastbones. The tether may be provided to make the pocket between the left half airbag and the right half airbag deep, thereby reducing the load on the breastbones.

In the present invention, the distance between the distal ends of the left airbag and the right airbag is from 150 mm to 450 mm when the airbag is inflated. As a result, the left half airbag faces the vicinity of the center of the left chest and the right half airbag faces the vicinity of the center of the right chest, so that the vicinity of the breastbones of the occupant can be securely supported by the airbag. Further, the horizontal distance from the distal ends to the deepest part of the space between the left and light half airbags is from 280 mm to 480 mm, so that a load on the vicinity of the breastbones is sufficiently reduced.

BRIEF DESCRIPTION OF THE DRAWINGS

FIGS. 9(a) and 9(b) are views of an airbag according to a still further embodiment, wherein FIG. 9(a) is an exploded perspective view of the airbag, and FIG. 9(b) is a perspective view of a gasbag;

FIGS. 14(a) and 14(b) are views showing an airbag according to a still further embodiment, wherein FIG. 14(a) is a perspective view of the airbag and FIG. 14(b) is a sectional view taken along line 14(b)-14(b) in FIG. 14(a);

FIGS. 16(a) and 16(b) are views showing the airbag shown in FIG. 14(a), wherein FIG. 16(a) is an exploded perspective view of the airbag and FIG. 16(b) is an enlarged view of a part 16(b) shown in FIG. 16(a);

FIGS. 18(a) to 18(c) are views showing an airbag according to a still further embodiment, wherein FIG. 18(a) is a side view of the airbag, FIG. 18(b) is a view seen along line 18(b)-18(b) in FIG. 18(a), and FIG. 18(c) is a view seen along line 18(c)-18(c) in FIG. 18(a);

FIGS. 22(a) to 22(c) are views showing an airbag according to a still further embodiment, wherein FIG. 22(a) is a side view of the airbag, FIG. 22(b) is a view seen along line 22(b)-22(b) in FIG. 22(a); and FIG. 22(c) is a view seen along line 22(c)-22(c) in FIG. 22(a);

FIG. 24 is a sectional view taken along line 24-24 in FIG. 23;

FIGS. 25(a) and 25(b) are exploded views of the airbag shown in FIGS. 22(a)-22(c);

FIGS. 26(a) to 26(c) are views showing an airbag according to a still further embodiment, wherein FIG. 26(a) is a side view of the airbag, FIG. 26(b) is a view seen along line 26(b)-26(b) in FIG. 26(a); and FIG. 26(c) is a view seen along line 26(c)-26(c) in FIG. 26(a);

DETAILED DESCRIPTION OF PREFERRED EMBODIMENTS

Figure 1:
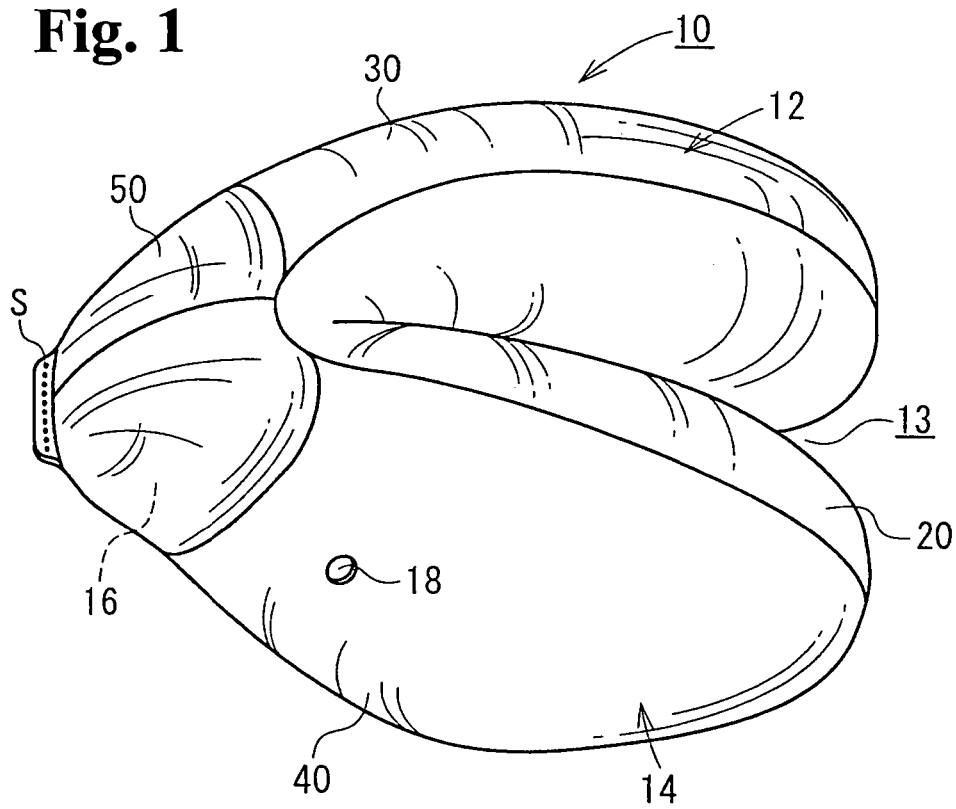
FIG. 1 is a perspective view of an airbag according to an embodiment of the present invention.
Figure 2:
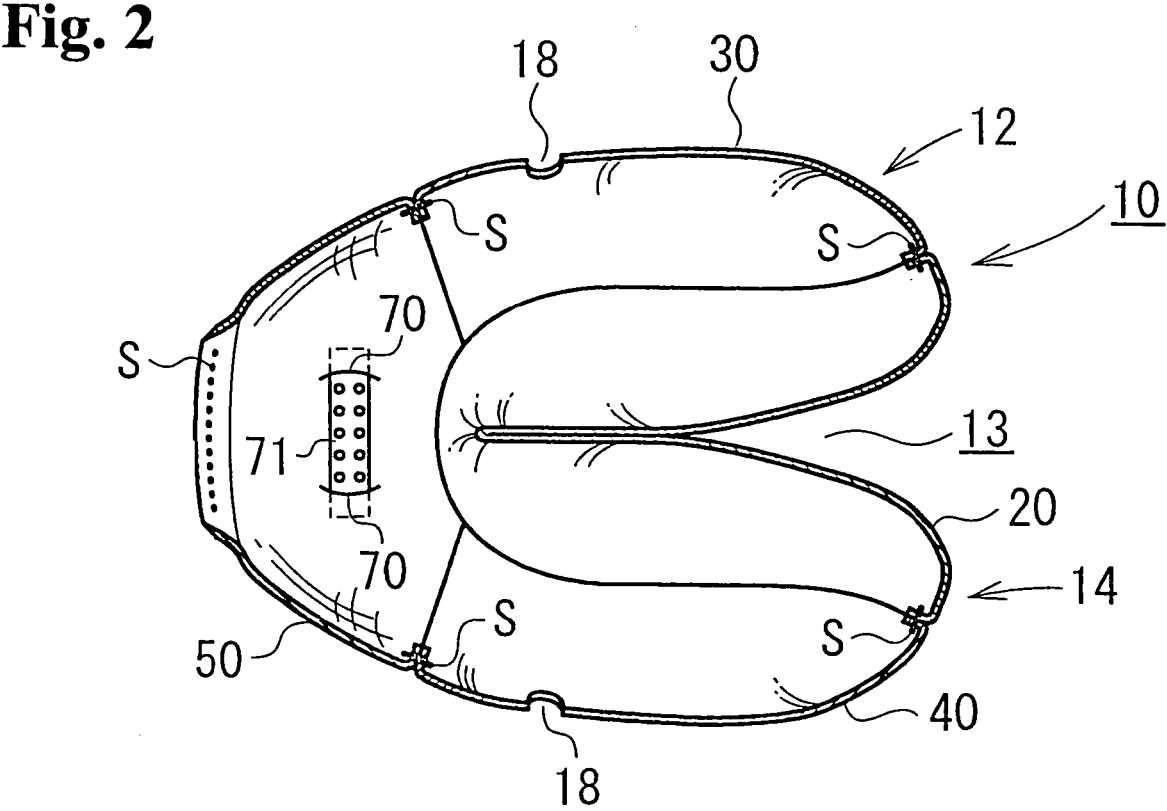
FIG. 2 is a sectional view of the airbag shown in FIG. 1.
Figure 3:
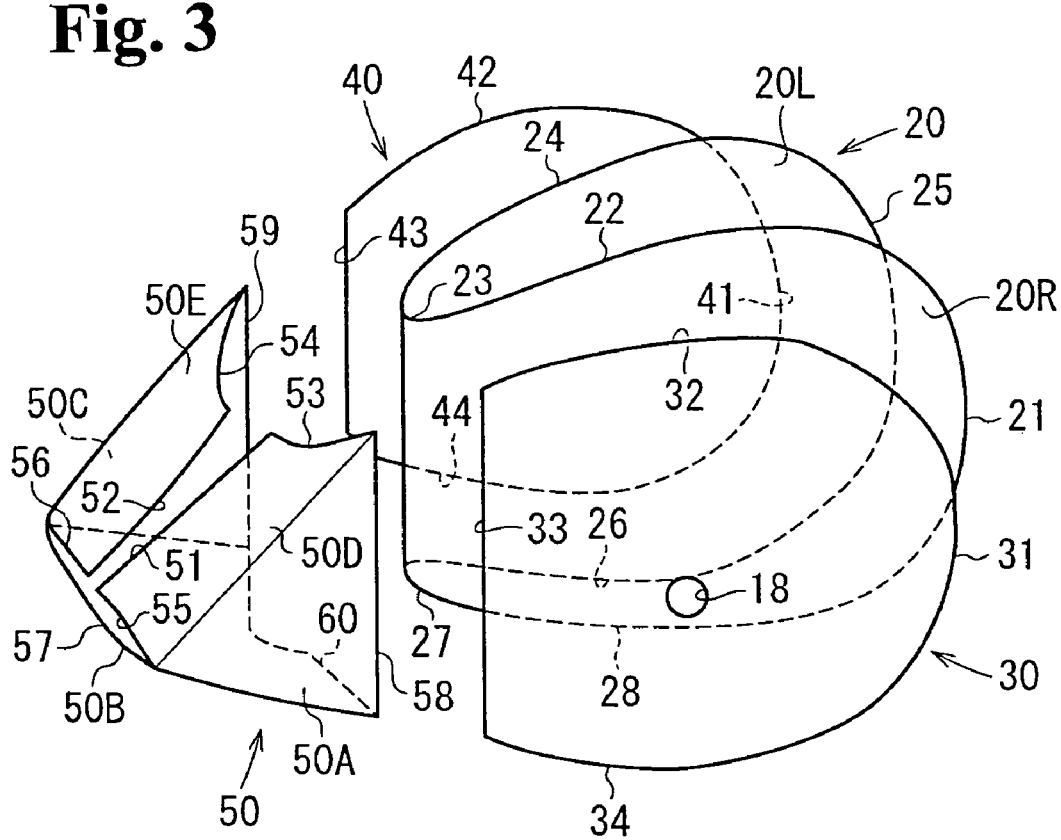
FIG. 3 is an exploded perspective view of the airbag shown in FIG. 1.
Figure 4:
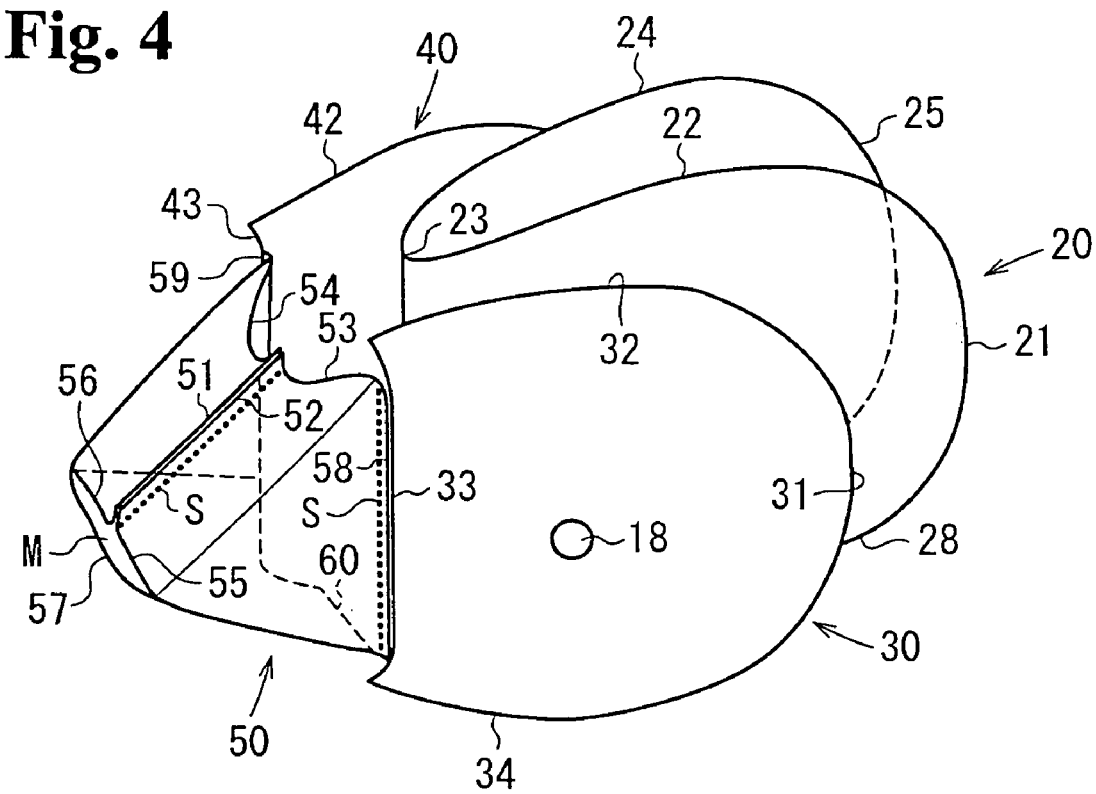
FIG. 4 is an exploded perspective view of the airbag shown in FIG. 1.

Hereunder, embodiments of the present invention will be described with reference to the accompanying drawings. FIG. 1 is a perspective view of an airbag 10 in an inflated state according to an embodiment of the present invention. FIG. 2 is a horizontal sectional view of the airbag 10, and FIGS. 3 and 4 are exploded perspective views of the airbag 10. The airbag 10 includes a right half airbag 12 to be inflated on a front right side of an occupant, a left half airbag 14 to be inflated on a front left side of the occupant, and a base-end chamber 16 communicating with base-ends of the right half airbag 12 and the left half airbag 14.

When the airbag 10 is inflated, there is no bridge member such as a tie panel between front ends of the right half airbag 12 and the left half airbag 14, and a space 13 is formed between distal ends, or front ends, of the half airbags to face the occupant (right direction in FIGS. 1 and 2). When the airbag 10 is fully inflated, a distance between the front end of the right half airbag 12 and the front end of the left half airbag 14 is preferably 150 mm to 450 mm, more preferably 170 mm to 430 mm. A horizontal distance between the front ends and the deepest part of the space 13 is preferably 280 mm to 480 mm, more preferably 310 mm to 450 mm. The right half airbag 12 and the left half airbag 14 have vent holes 18 in outer surfaces thereof.

A configuration of the airbag 10 will be explained in detail next. Note that a front side (distal end) of a panel is a front-end side in a direction that the airbag 10 is inflated and a rear side of a panel is a base-end side in a direction that the airbag 10 is inflated. The airbag 10 is formed of four panels, namely an inner panel 20, a right outer panel 30, a left outer panel 40, and a base-end panel 50. The inner panel 20 is a substantially guitar-shaped long panel, which is folded at the center into a right side 20R and a left side 20L. The inner panel 20 has a right side 20R forming an inner surface of the right half airbag 12 and a left side 20L forming an inner surface of the left half airbag 14. A periphery of the inner panel 20 is formed of the right side 20R having a lower side 28, a front-end side 21, an upper side 22, and an upper side 23 in the vicinity of a folded portion in the deepest pocket of the airbag, and the left side 20L having an upper side 24, a front-end side 25, a lower side 26, and a lower side 27 in the folded portion.

A periphery of the right outer panel 30 is formed of a front-end side 31, an upper side 32, a linear rear side 33, and a lower side 34. The left outer panel 40 is formed of a front-end side 41, an upper side 42, a linear rear side 43, and a lower side 44. The base-end panel 50 has a right-side surface 50A, a bottom 50B, a left-side surface 50C, a right flap 50D forming an upper right side, and a left flap 50E forming an upper left side. The base-end panel 50 is folded to make the side surfaces 50A and 50C substantially triangular and is open to the front end of the airbag.

A periphery of the base-end panel 50 is formed of opposing sides 51 and 52 of the substantially rectangular flaps 50D and 50E, the respective front sides (flap front sides) 53 and 54 of the flaps 50D and 50E, the respective rear sides 55 and 56 of the flaps 50D and 50E, a rear side 57 facing the rear sides 55 and 56, the respective front sides (side-front sides) 58 and 59 of the side surfaces 50A and 50C, and a bottom front side 60 connecting the front sides 58 and 59 together.

In producing the airbag 10, the base-end panel 50 is first spread to become flat, and the rear side 33 of the right outer panel 30 and the rear side 43 of the left outer panel 40 are sewn to the side-front sides 58 and 59, respectively. The opposing respective sides 51 and 52 of the flaps 50D and 50E of the base-end panel 50 are then stitched together. The panels 30, 40, and 50 are formed as shown FIG. 4, in which character S denotes a seam.

As shown in FIG. 4, the right outer panel 30 and the right side 20R of the inner panel 20 are opposed, wherein the front ends 21 and 31, the upper sides 22 and 32, and the lower sides 28 and 34 are stitched together, respectively. Also, the left outer panel 40 and the left side 20L of the inner panel 20 are opposed, wherein the front-end sides 25 and 41, the upper sides 24 and 42, and the lower sides 26 and 44 are stitched together, respectively. The flap front sides 53 and 54 of the base-end panel 50 are sewn on the upper side 23 in the folded portion of the inner panel 20, and the bottom front side 60 of the base-end panel 50 and the lower side 27 in the folded portion are stitched together.

As a result, the airbag is in a reversed state of the airbag 10 (FIG. 1), i.e. a state that the seam allowances are exposed on the surface of the airbag. As shown in FIG. 4, the flap rear sides 55 and 56 of the base-end panel 50 and the rear side 57 are not yet stitched together, instead form an opening M in this state. Then, the airbag is turned inside out through the opening M, and the opening M is stitched to form the airbag 10 shown in FIG. 1. As shown in FIG. 2, the bottom of the base-end panel 50 has two substantially parallel slits 70, through which an inflator 71 passes.

The airbag 10 is mounted to a front-passenger-side airbag system for protecting a front-seat occupant of a car during a car crash. The airbag 10 is housed in a casing (container) in a folded condition and a lid is mounted to the casing to cover the folded airbag 10, thereby forming an airbag system (not shown). The lid is torn and opened by a pressure from the airbag 10 when the airbag 10 is inflated. The airbag system is mounted in an airbag-system installation opening in an upper surface of an instrument panel in front of the front passenger seat of the car.

In the airbag system, the inflator 71 is activated to eject gas in case of a car crash. The gas from the inflator 71 first inflates the base-end chamber 16 and then flows into the right half airbag 12 and the left half airbag 14 to inflate them. In the airbag 10, the base-end chamber 16 contacts the instrument panel to become stable in position. Therefore, the right half airbag 12 and the left half airbag 14 become stable in position not only after the inflation but also during the inflation.

The gas is supplied from the base-end chamber 16 to the right half airbag 12 and the left half airbag 14 substantially equally. Therefore, both the right half airbag 12 and the left half airbag 14 are inflated smoothly and substantially symmetrically from the early stage of the inflation. When the airbag 10 is fully inflated, the space 13 is formed between the front ends of the right half airbag 12 and the left half airbag 14 to face the occupant. The right half airbag 12 receives the right thorax of the occupant, the left half airbag 14 receives the left thorax, and the space 13 faces the vicinity of the breastbones. Therefore, the reaction force applied to the breastbones during the reception of the airbag is small.

Further embodiments of the invention will be described with reference to FIGS. 5 to 10. An airbag 10A shown in FIG. 5 has the upper side 23 in the folded portion arranged closer to the base-end than the lower side 27 as an inner panel 20A. According to the embodiment, the opposing respective sides 51 and 52 of the flaps 50D and 50E are shorter than those of the embodiments described above. The flap front sides 53 and 54 are cut into the base-end deeper than that of the embodiments described above. Other arrangements are the same as those in the embodiments.

Figure 5:
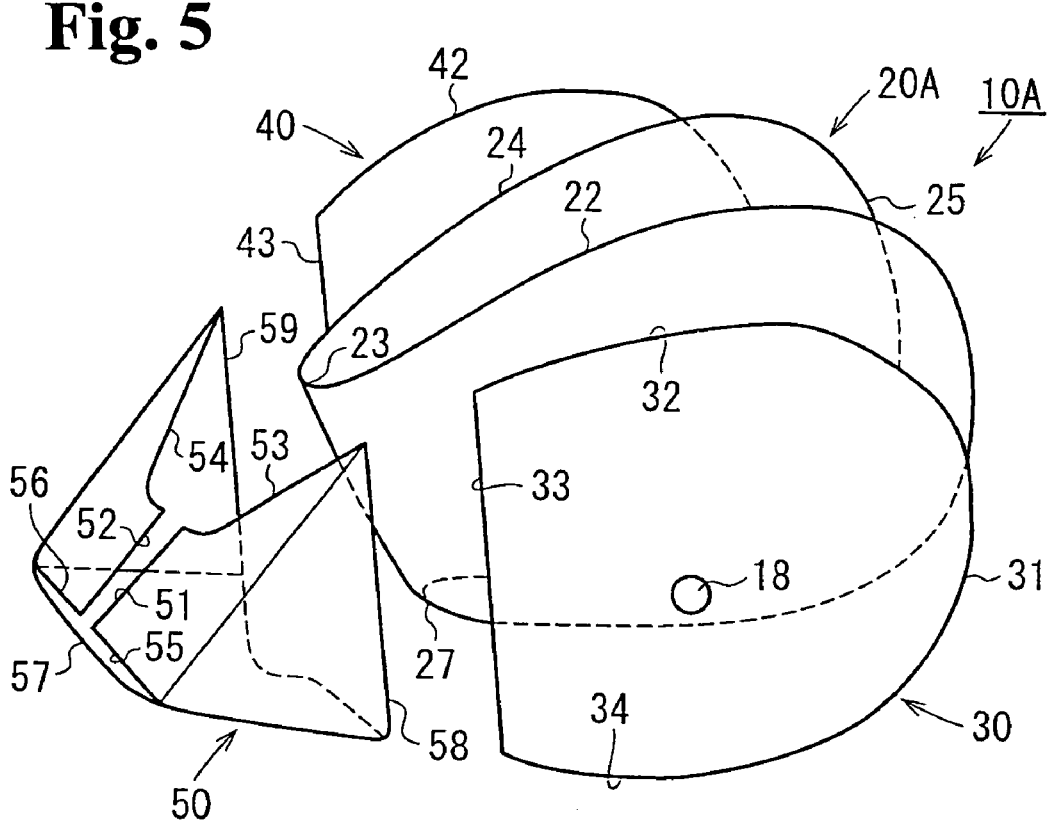
FIG. 5 is an exploded perspective view of an airbag according to another embodiment.

In the airbag 10A shown in FIG. 5, an upper portion of the space (pocket) 13 between the right half airbag 12 and the left half airbag 14 is located at a position deeper than that of a lower portion thereof. The base-end chamber 16 has a small capacity, so that the base-end chamber and the entire airbag are inflated quickly.

Figure 6:
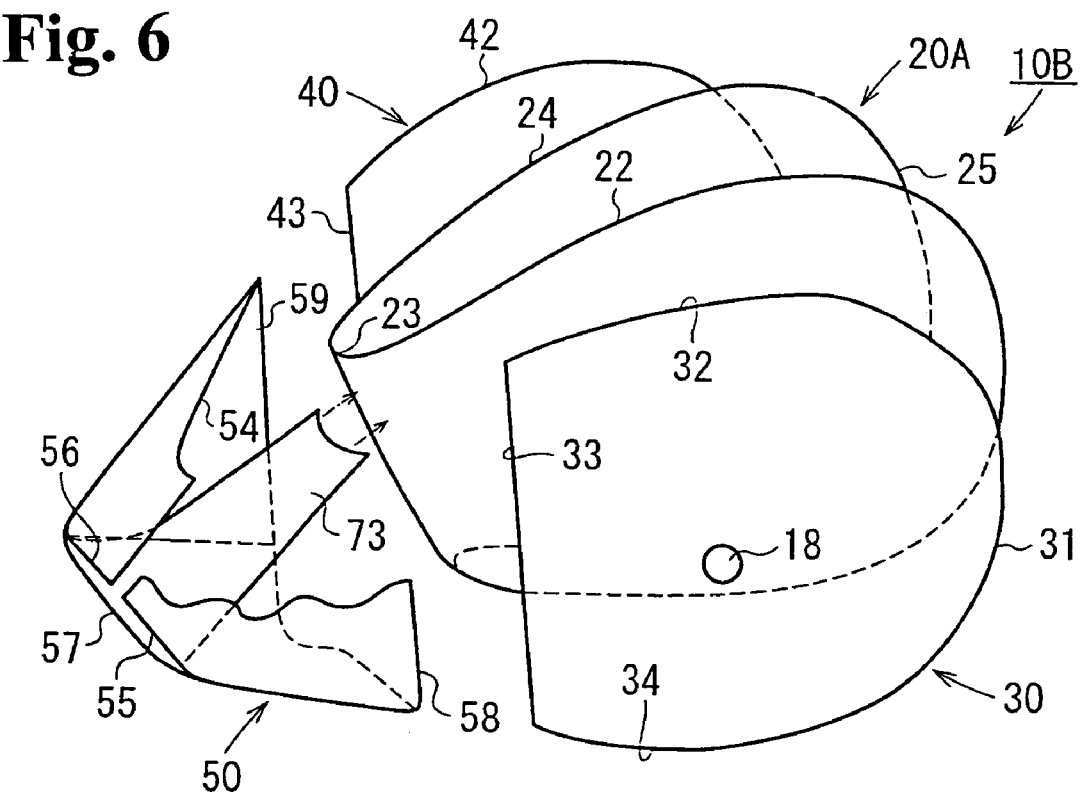
FIG. 6 is an exploded perspective view of an airbag according to a further embodiment.

In an airbag 10B shown in FIG. 6, a base-end of the base-end panel 50 is joined to a vicinity of the upper side 23 in the folded portion of the inner panel 20A with a tether 73. Accordingly, the tether 73 restricts a projection of the deepest portion of the pocket of the airbag 10B and regulates a position of the deepest portion of the pocket. Therefore, it is possible to inflate the airbag 10B quickly. It is also possible to provide the tether 73 in the airbag 10 shown in FIGS. 1 to 5.

Figure 7:
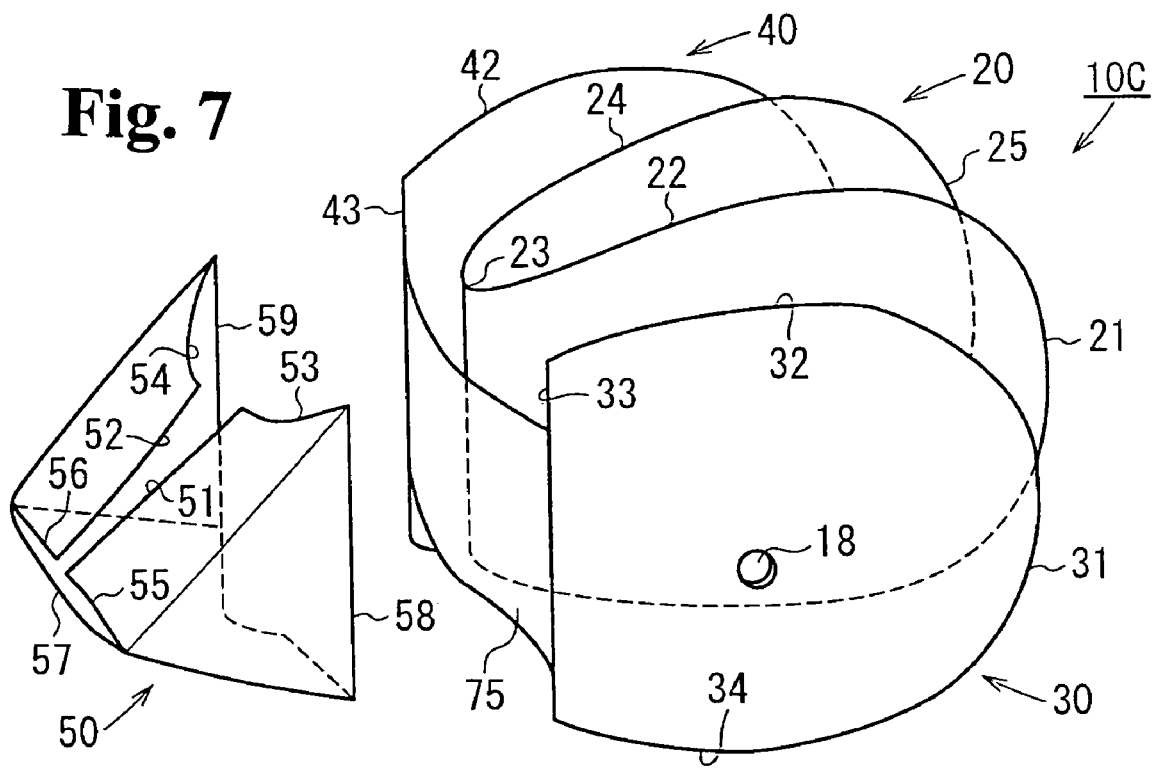
FIG. 7 is an exploded perspective view of an airbag according to a still further embodiment.

In an airbag 10C shown in FIG. 7, the rear side 33 of the right outer panel 30 and the rear side 43 of the left outer panel 40 are joined together with a connection panel 75. The connection panel 75 has a vertical width smaller than the lengths of the rear sides 33 and 43, thereby providing a space at upper and lower sides of the connection panel 75 for communicating the base-end chamber 16 with the right half airbag 12 and the left half airbag 14, respectively. With this arrangement, it is possible to inflate the base-end chamber 16 more quickly and stabilize the airbag 10C in the early stage of the inflation.

The connection panel 75 reduces a gas pressure applied to the folded portion of the inner panel 20. The connection panel 75 also restricts a lateral width of the airbag 10C during the inflation. The connection panel 75 may be connected to the folded portion of the inner panel 20, thereby making the pocket 13 of the airbag 10C deep.

Figure 8:
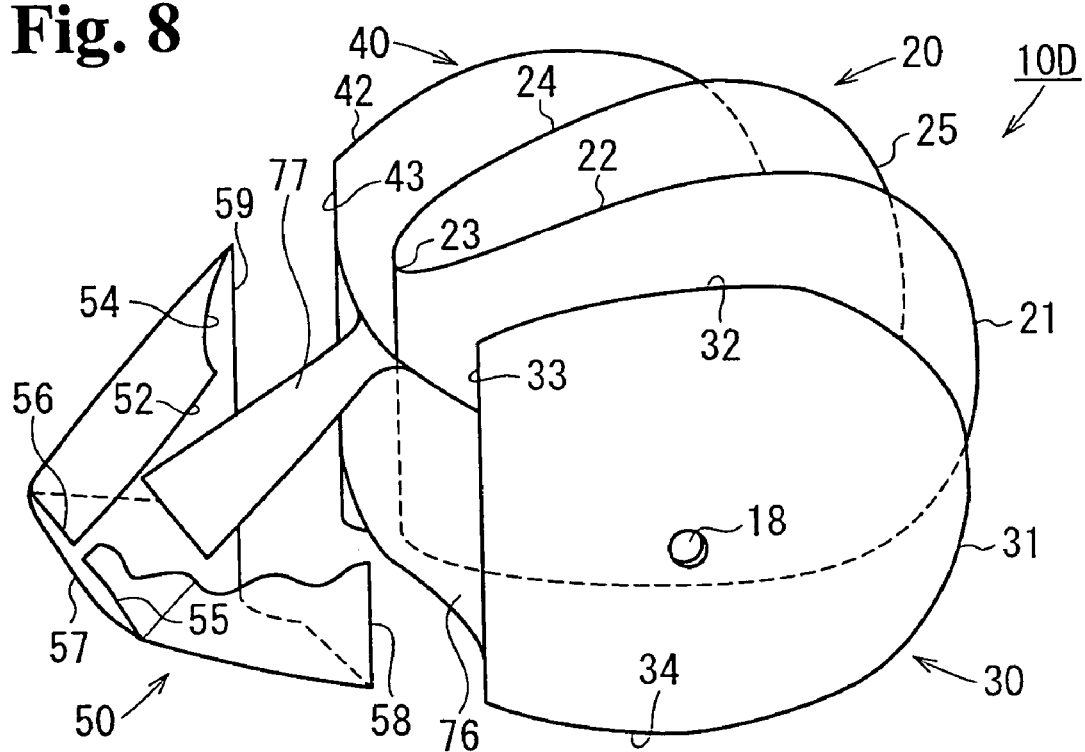
FIG. 8 is an exploded perspective view of an airbag according to a still further embodiment

An airbag 10D shown in FIG. 8 has a tether 77 between a lateral center of a connection panel 76 and a base-end of the base-end panel 50. The tether 77 may be made of a piece of cloth integrated with the connection panel 76. The connection panel 76 may be connected to the folded portion of the inner panel 20. With this arrangement, it is possible to situate the connection panel 76 close to the base-end of the airbag 10D during the inflation of the airbag 10D.

Figure 9A:
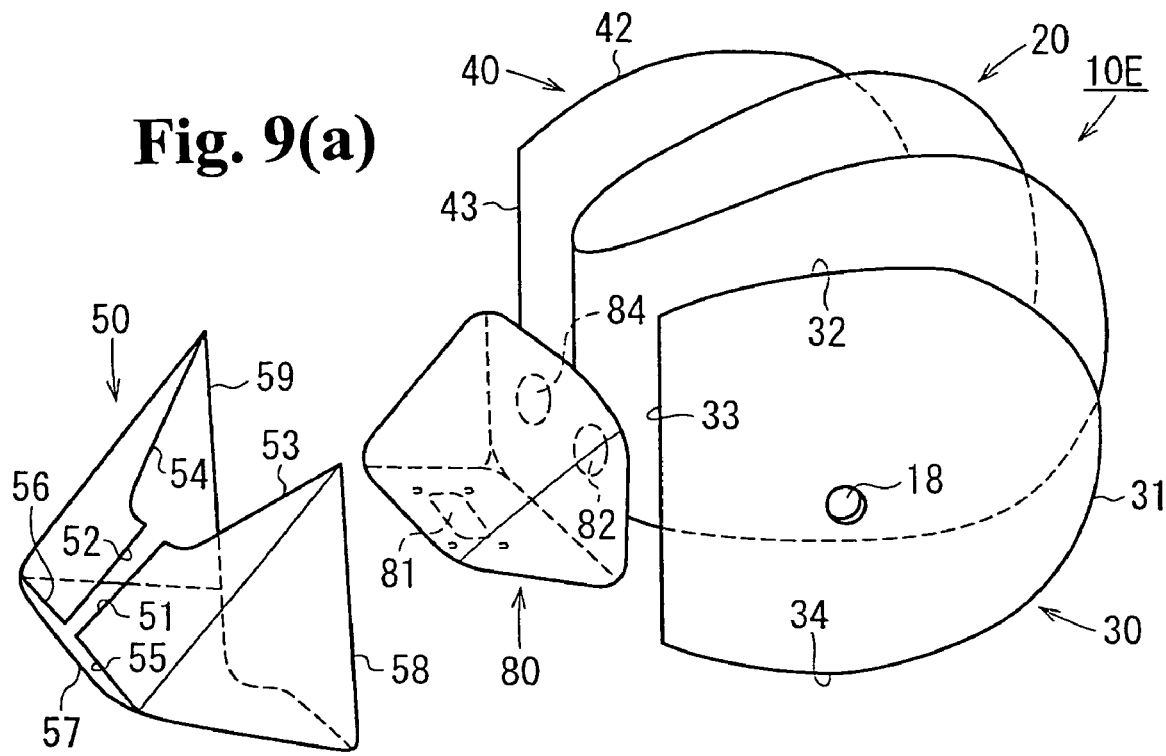

An airbag 10E shown in FIG. 9(a) includes a gasbag 80 in the base-end chamber 16, and the gas from an inflator is supplied into the right half airbag 12 and the left half airbag 14 through the gasbag 80. An end portion of the gasbag 80 may be connected to the folded portion of the inner panel 20. The gasbag 80 has a gas-inlet opening 81 in a bottom surface thereof and gas-discharge openings 82 and 84 in a front end surface thereof. The gas-discharge opening 82 faces the interior of the right half airbag 12, and the gas-discharge opening 84 faces the interior of the left half airbag 14. Fastener insertion holes 85 for bolts and rivets are provided around the gas-inlet opening 81 to secure the gasbag 80 to the casing of the airbag system. Similar fastener insertion holes are provided in a bottom surface of the base-end panel 50.

In this embodiment, the gasbag 80 has the gas-discharge openings 82 and 84. Alternatively, the number of the openings is not limited to two. As FIG. 10 shows, a gasbag 80A may have a large number of small openings 88 for discharging the gas.

Figure 9B:
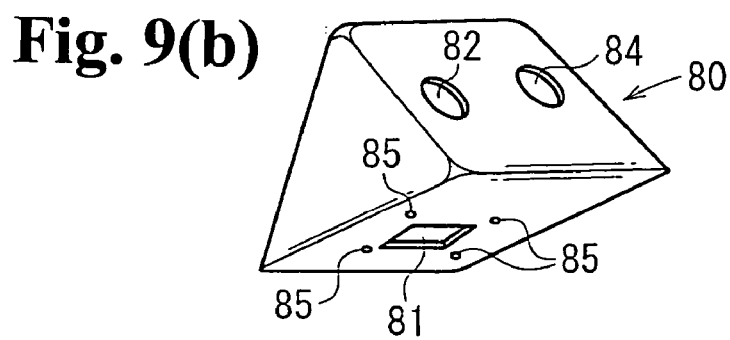
Figure 10:
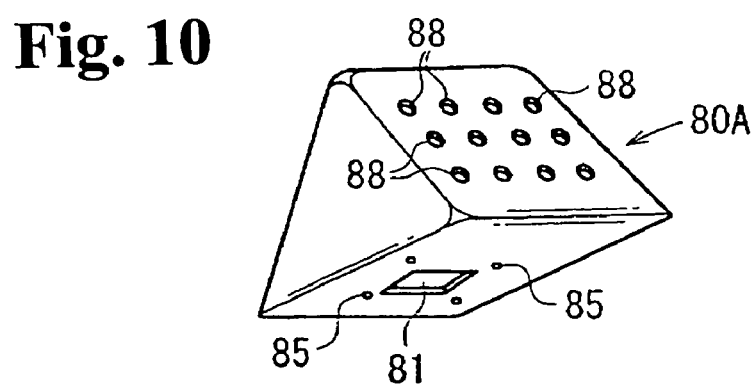
FIG. 10 is a perspective view of a gasbag for an airbag according to a still further embodiment.

In the airbag 10E shown in FIGS. 9(a), 9(b) and 10, the gas is equally supplied to the left and right. Especially, in the airbag 10E shown in FIG. 9(a), a pressure of the gas applied to the folded portion of the inner panel 20 is significantly reduced. Other arrangements shown in FIGS. 6 to 9(b) are the same as those of the airbag 10 in FIGS. 1 to 5.

The embodiments described above are only examples of the invention and the invention may provide other arrangements in addition to those illustrated. For example, in the embodiment shown in FIG. 9(a), the gas-discharge openings 82 and 84 may be closed with closing means such as a tear seam and so on, and the closing means is released when a gas pressure in the gasbag 80 reaches a predetermined level, so that the gas is supplied into the right half airbag 12 and left half airbag 14.

According to the invention, midsections of the left half airbag and the right half airbag may be joined together directly or with a panel, a cord, a net and so on. The left half airbag and the right half airbag may be formed in symmetry shapes or asymmetry shapes. The left half airbag and the right half airbag may have same or different volumes.

According to the invention, the inner panel may be formed of two panels or more joined together by stitching or the like. For example, the inner panel may be formed of two panels with the shape same as that of the outer panel and a connecting panel, i.e. total three panels. The panels may be made by other ways.

As described above, the invention provides the airbag and the airbag system in which the base-end chamber thereof is inflated earlier than the front end portion thereof. According to the invention, when the airbag is inflated, the left half airbag receives the left thorax of an occupant and the right half airbag receives the right thorax. The space between the half airbags faces the vicinity of the breastbones of the occupant.

Figure 11:
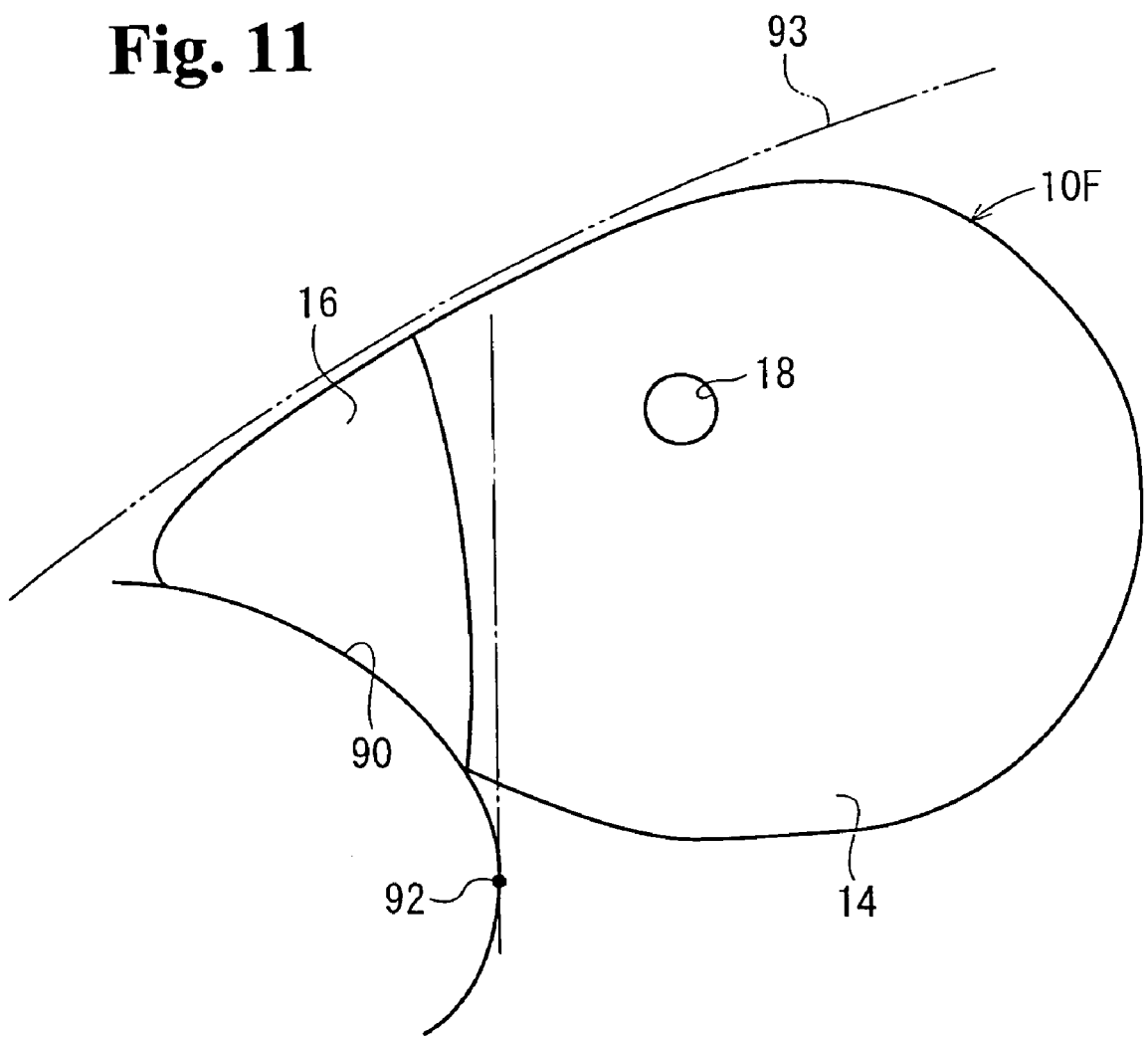
FIG. 11 is a side view of an instrument panel in a vehicle cabin showing an airbag in an inflated state according to a still further embodiment.

Referring to FIGS. 11 and 12(a) to 12(d), a preferable structure of the airbag when the airbag system of the invention is mounted on an instrument panel will be described. FIG. 11 is a side view of the instrument panel in a vehicle cabin showing an airbag 10F in an inflated state according to a still further embodiment. FIGS. 12(a) to 12(d) are perspective views showing a process of inflation of the airbag 10F.

Figure 12A:
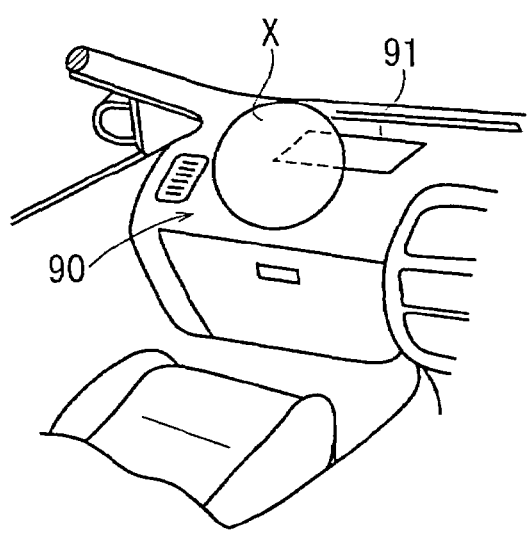
FIGS. 12(a) to 12(d) are perspective views showing a process of inflation of the airbag shown in FIG. 11.

As shown in FIG. 11, in the airbag 10F, upon a car crash, the base-end chamber 16 is inflated along an upper surface of an instrument panel 90 through an airbag-system opening 91 (see FIG. 12(a)) provided in the upper surface of the instrument panel 90. The right half airbag 12 and the half left airbag 14 are inflated toward the passenger (the rear side of the car) while separating from the base-end chamber 16. Reference numeral 93 denotes a windshield of the car.

As shown in FIG. 11, when the airbag 10F is inflated, the rear end of the base-end chamber 16 (part of an outer surface of the base-end chamber 16 closest to the rear side of the car) is positioned closer to the front side of the car than the rear end 92 of the instrument panel 90 (part of an outer surface of the instrument panel 90 closest to the rear side of the car).

Figure 12B:
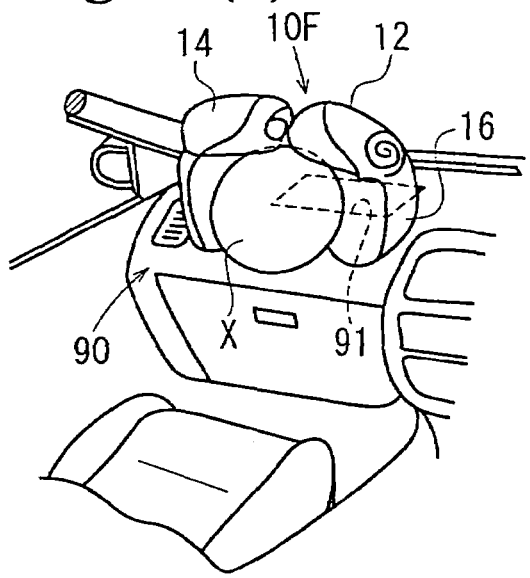

In the airbag 10F with such a structure, as shown in FIG. 12(b), even when an object X is present in the vicinity of the instrument panel 90, the object X does not or hardly contact the base-end chamber 16 inflated along the upper surface of the instrument panel 90.

Figure 12C:
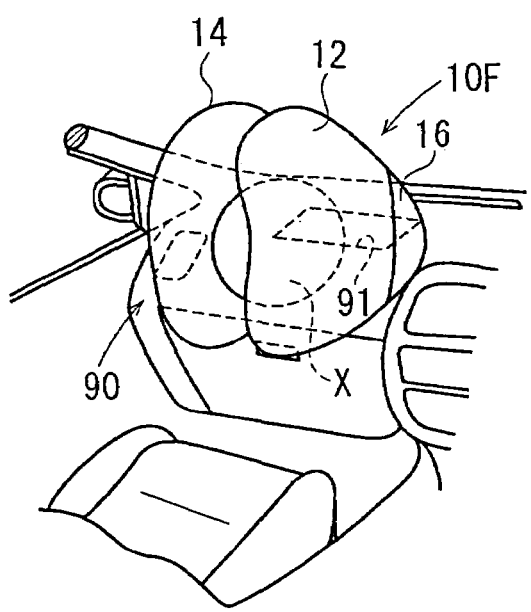
Figure 12D:
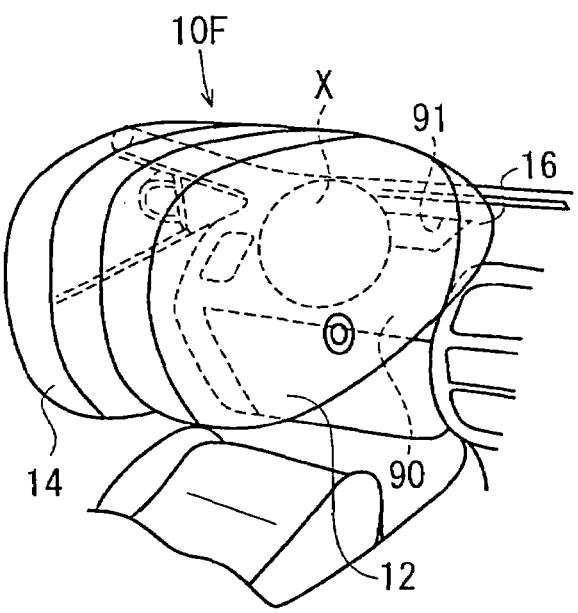

As shown in FIGS. 12(c) and 12(d), the airbag 10F is then inflated from the base-end chamber 16 toward the rear side of the car. The right half airbag 12 and the left half airbag 14 are inflated along both sides of the object X. Accordingly, it is possible to reduce a force applied from the airbag 10F to the object X toward the rear side of the car.

Figure 13:
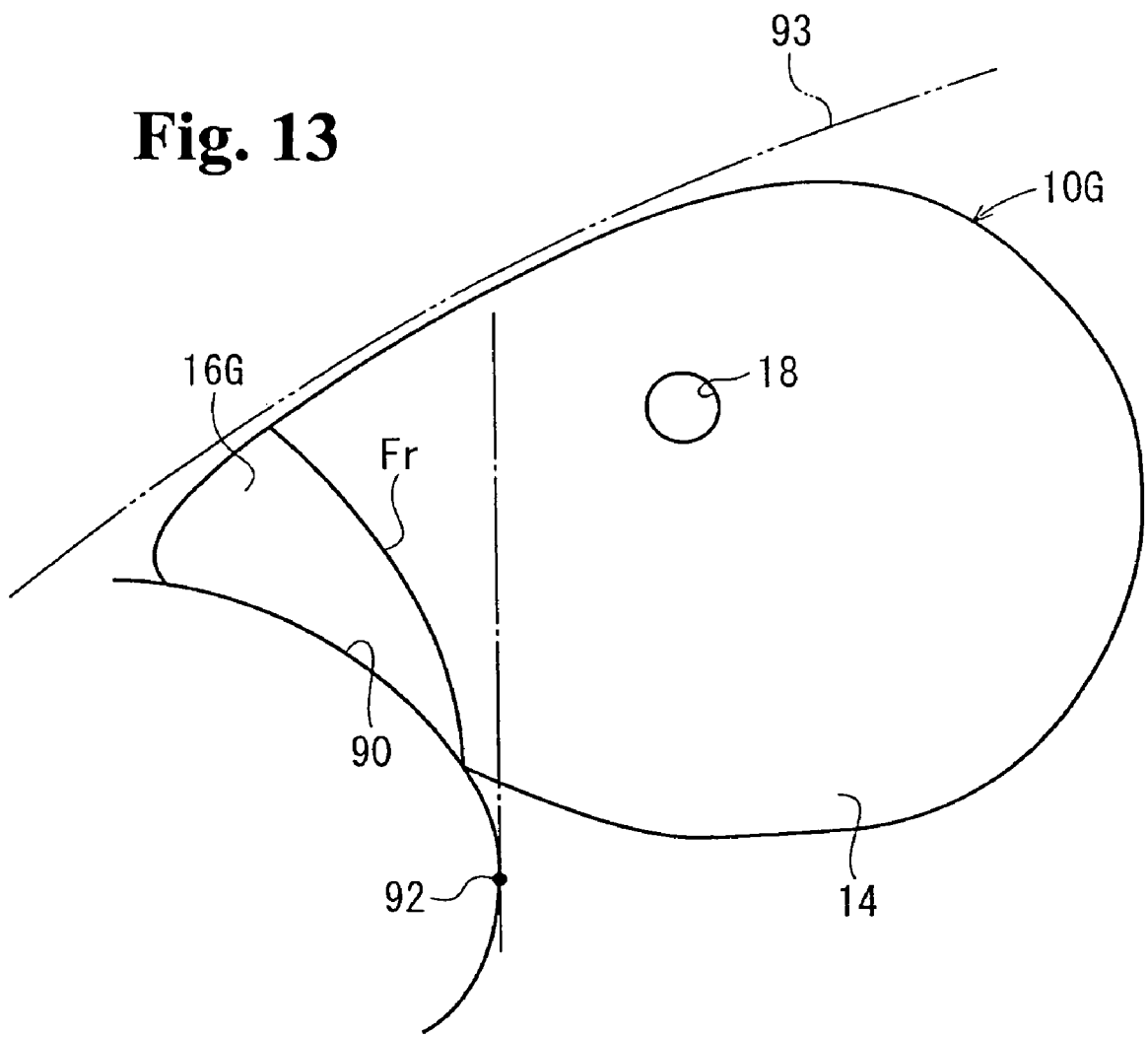
FIG. 13 is a side view of an instrument panel in a vehicle cabin showing an airbag in an inflated state according to a still further embodiment.

FIG. 13 is a side view of the instrument panel in a vehicle cabin showing an airbag 10G in an inflated state according to a still further embodiment. When the airbag 10G is inflated, a rear end Fr of a base-end chamber 16G inflated along the upper surface of the instrument panel 90 in the front-to-rear direction of the vehicle (boundary between the base-end chamber 16G and the right (not shown) and left half airbags 14) is positioned closer to the front side of the car than the rear end 92 of the instrument panel 90 (part of the outer surface of the instrument panel 90 closest to the rear side of the car). The rear end Fr of the base-end chamber 16G inclines such that an upper part thereof is positioned closer to the front side of the car.

In the airbag 10G with such an arrangement, when the base-end chamber 16G is inflated, the rear end Fr thereof is away from the rear end 92 of the instrument panel 90 upwardly toward the front side of the car. Therefore, even when the object X is located on the instrument panel 90, it is possible to keep the object X away from the base-end chamber 16G.

Figure 14A:
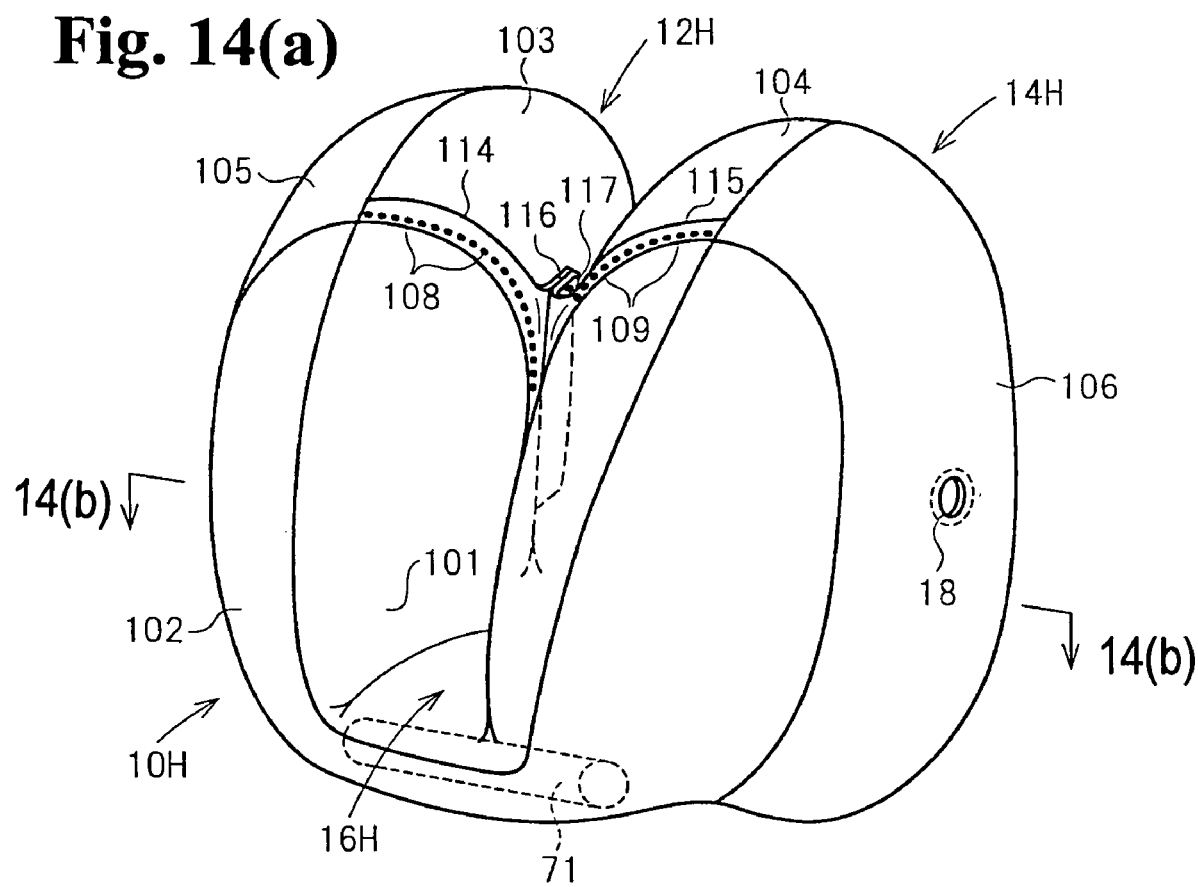
Figure 14B:
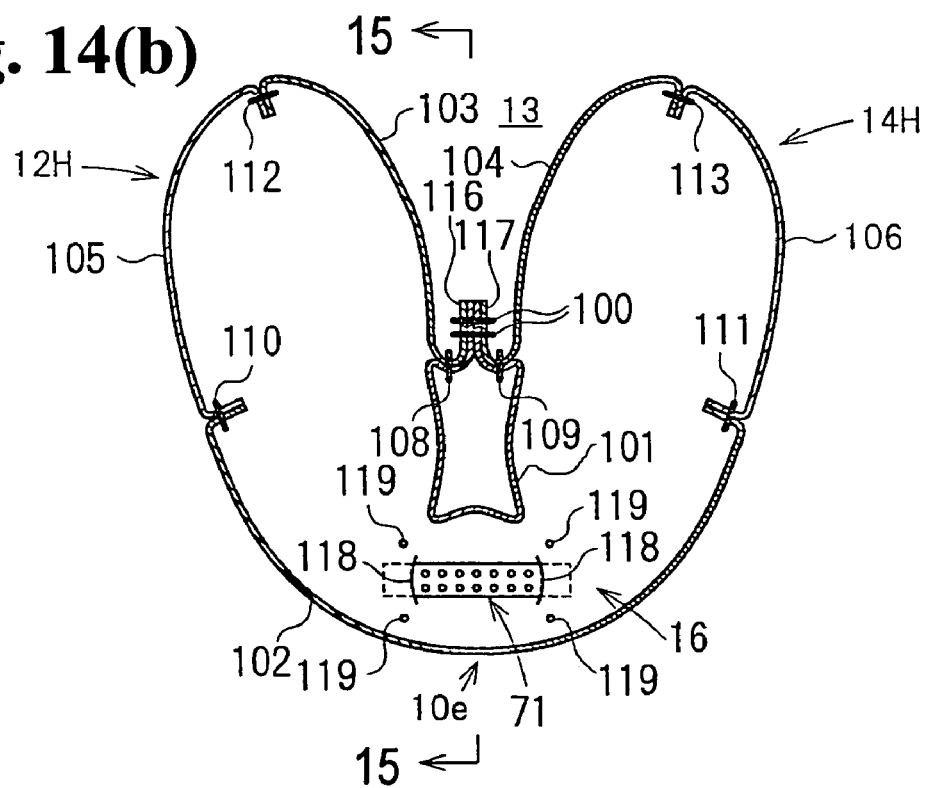
Figure 15:
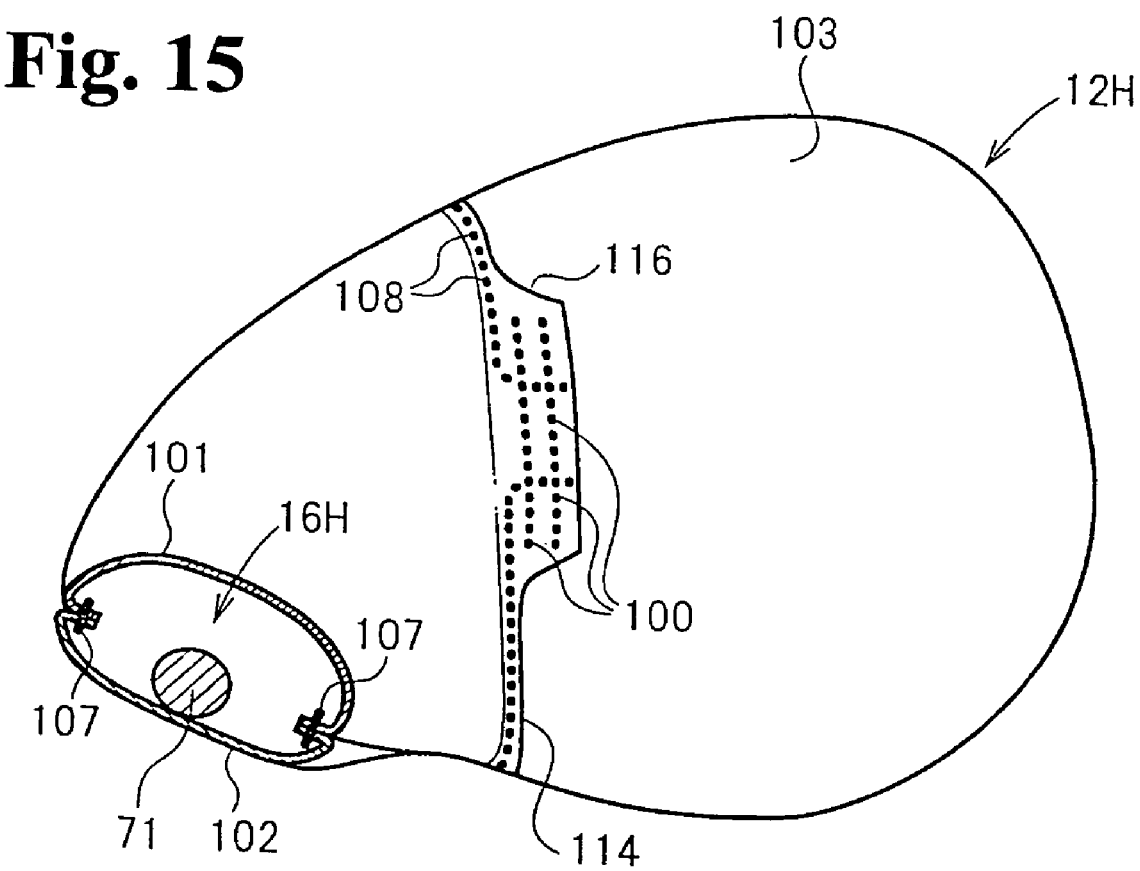
FIG. 15 is a sectional view taken along line 15-15 in FIG. 14(b)
Figure 16A:
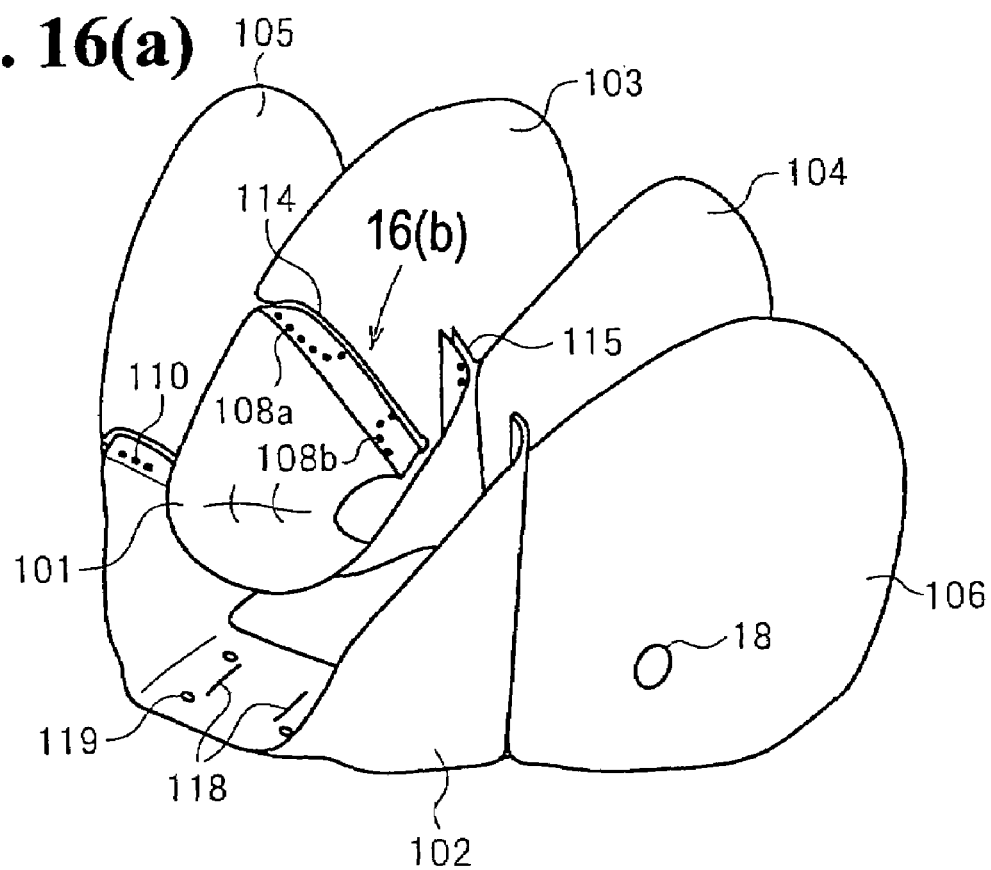
Figure 16B:
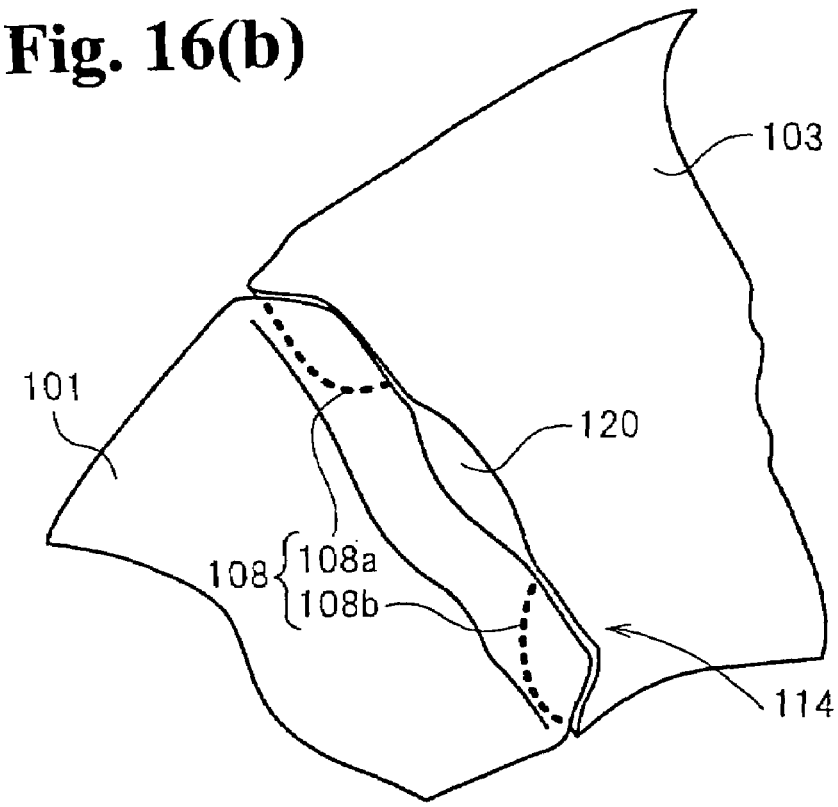
Figure 17:
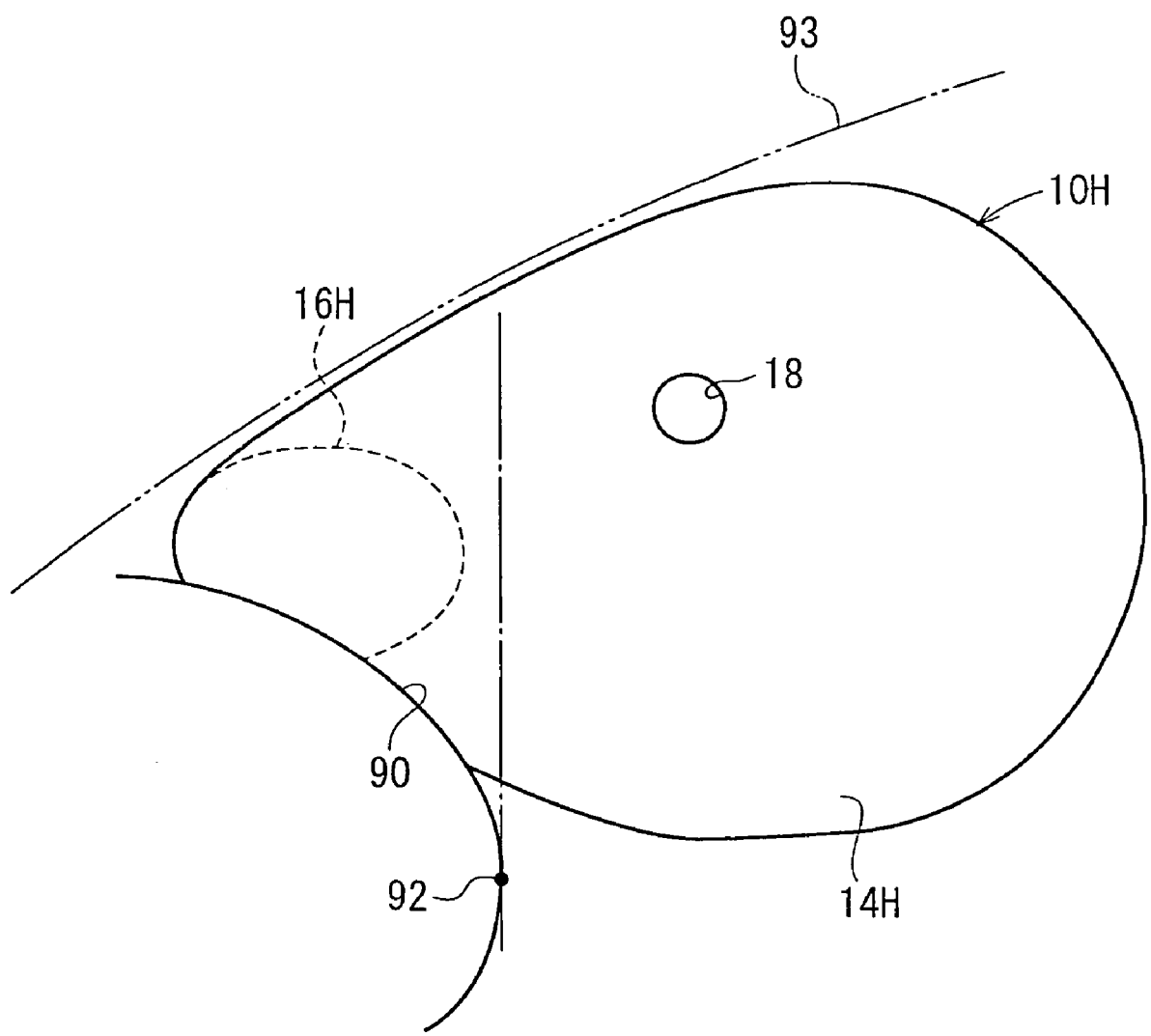
FIG. 17 is a side view of an instrument panel in a vehicle cabin showing the airbag shown in FIG. 14(a) in an inflated state.

Referring to FIGS. 14(a) to 30, other embodiments of the invention will be described. FIG. 14(a) is a perspective view of an airbag 10H according to a still further embodiment; and FIG. 14(b) is a sectional view taken along line 14(b)-14(b) in FIG. 14(a). FIG. 15 is a sectional view taken along line 15-15 in FIG. 14(b). FIG. 16(a) is an exploded perspective view of the airbag 10H and FIG. 16(b) is an enlarged view of a part 16(b) shown in FIG. 16(a). FIG. 17 is a side view of an instrument panel in a vehicle cabin showing the airbag 10H in an inflated state.

As shown in FIGS. 14(a), 14(b) and 15, a base-end chamber 16H of the airbag 10H has a cylindrical shape extending laterally so that base ends of a right half airbag 12H and a left half airbag 14H communicate with each other. The airbag 10H is a passenger protecting airbag. As shown in FIG. 17, upon a car crash, the base-end chamber 16H is inflated along the upper surface of the instrument panel 90 through an airbag opening (not shown) provided in the upper surface of the instrument panel 90. The right half airbag 12H and the left half airbag 14H are inflated toward a passenger (rear side of the car) while separating from the base-end chamber 16H.

As shown in FIG. 17, when the airbag 10H is inflated, the rear end of the base-end chamber 16H is positioned closer to the front side of the car than the rear end 92 of the instrument panel 90 in the front-to-rear direction of the car. Accordingly, even when the object X is present on the instrument panel 90, it is possible to keep the object X away from the base-end chamber 16H inflated along the upper surface of the instrument panel 90.

In the airbag 10H, a midsection of the right half airbag 12H in the inflating direction is joined to a midsection of the left half airbag 14H with a seam (sewing thread) 100. In this embodiment, the airbag 10H is constructed of panels 101, 102, 103, 104, 105, and 106 joined by stitching.

As shown in FIG. 16(a), the panel 101 (rear inner panel) constructs surfaces of the right half airbag 12H and the left half airbag 14H from the midsections to the base ends in the inflating direction and a center surface of the base-end chamber 16H. The panel 102. (rear outer panel) constructs a surface. (airbag outer surface) opposite to the rear inner panel 101. The panels 103 and 104 (front inner panels) construct the surfaces of the right half airbag 12H and the left half airbag 14H from the midsections to the distal ends in the inflating direction at the center of the airbag (opposing surfaces of the right half airbag 12H and the left half airbag 14H). The panels 105 and 106 (front outer panels) construct surfaces (airbag outer surfaces) opposite to the front inner panels 103 and 104.

At a seam 107 (stitching thread), the rear inner panel 101 and the rear outer panel 102 are stitched together. At seams 108 and 109, the rear inner panel 101 is stitched to the front inner panels 103 and 104, respectively. At seams 110 and 111, the rear outer panel 102 is stitched to the front outer panels 105 and 106, respectively. At a seam 112, peripheries of the front inner panel 103 and the front outer panel 105 are stitched, and at a seam 113, peripheries of the front inner panel 104 and the front outer panel 106 are stitched.

A vent hole 18 of the left half airbag is provided in the front outer panel 106. The front outer panel 105 has a similar vent hole (no shown).

As shown in FIG. 14(a), the seam allowances (joint allowances) 114 and 115 of the rear inner panel 101 and the front inner panels 103 and 104 are arranged to be exposed to the outer surface of the right half airbag 12 and the left half airbag 14 of the airbag product, respectively. As shown in FIGS. 14(a), 14(b) and 15, tongue-shaped joint allowances 116 and 117 (only the joint allowance 116 is shown in FIG. 15) project from the seam allowances 114 and 115, respectively. As shown in FIGS. 14(a) and 14(b), the joint allowances 116 and 117 are stitched with a seam 100.

As described above, the right half airbag 12H and the left half airbag 14H are joined together at the midsections of the opposing surfaces in the inflating direction with the seam allowances 114 and 115 of the rear inner panel 101 and the front inner panels 103 and 104. A distance from the rear end 10e of the inflated airbag to the seam 100 is preferably from 30 to 70 percent, particularly, from about 40 to 55 percent of a length of the inflated airbag 10.

The rear outer panel 102 that constructs the base-end chamber 16H is provided with a pair of slits 118 for an inflator to pass therethrough. This embodiment also includes the rod inflator 71, as shown in FIGS. 14(a) and 14(b). Specifically, the rod inflator 71 is inserted in the slits 118 so as to pass through the base-end chamber 16H along a width of the car, and opposite ends of the inflator are arranged at an outside of the airbag 10H. Reference numeral 119 denotes a hole for a fastener (not shown) such as a bolt to pass therethrough for connecting the airbag 10H to the casing (not shown) of the airbag system. Other arrangements of the airbag. 10H and the airbag system including the airbag 10H are similar to those of the embodiment shown in FIGS. 1 and 2. Reference numerals in FIGS. 14(a), 14(b) to 17 same as those of FIGS. 1 and 2 indicate the same components.

In the airbag 10H, the right half airbag 12H and the left half airbag 14H are inflated from a folded state in storage. Even when one of the right half airbags 12H and 14H is inflated earlier than the other, the one airbag pulls the other airbag to facilitate the inflation as the right half airbag 12H and the left half airbag 14H are joined together. Moreover, since the right half airbag 12H and the left half airbag 14H are joined together with the seam 100 at the midsections thereof in the inflating direction, the one airbag starts pulling the other airbag in the inflating direction at a relatively early stage of the inflation. Accordingly, both the right half airbag 12H and the left half airbag 14H are inflated smoothly and equally from the beginning of the inflation.

A process of manufacturing the airbag 10H will be explained next. As shown in FIG. 16(a), the rear inner panel 101 and the front inner panels 103 and 104 are stitched together with the seams 108 and 109, respectively. The rear outer panel 102 and the front outer panels 105 and 106 are stitched together with the seams 110 and 111, respectively. At that time, the respective seam allowances 114 and 115 of the rear inner panel 101 and the front inner panels 103 and 104 are arranged at sides exposed to the outside of the airbag in the airbag product.

According to the embodiment, as shown in FIG. 16(b), the rear inner panel 101 and the front inner panel 103 are stitched together only at opposite ends of the seam allowance 114 with the seam 108 (108a and 108b). Between the seams 108a and 108b, an opening 120 for reversing the airbag is formed. A stitched body of the rear inner panel 101 and the front inner panels 103 and 104 and a stitched body of the rear outer panel 102 and the front outer panels 105 and 106 are superposed such that the surfaces exposed to the exterior of the airbag face each other in the airbag product, and peripheries thereof are then stitched together with the seams 107, 112, and 113. A reversed airbag intermediate product is thus produced.

The airbag intermediate product is reversed through the opening 120 formed in the seam allowance 114. Thereafter, the respective joint allowances 116 and 117 of the seam allowances 114 and 115 are stitched together with the seam 100 to complete the airbag 10H product. When the joint allowances 116 and 117 are stitched together, the opening 120 is closed with the seam 100. Since the airbag 10H is constructed of a plurality of the panels, the outer surface of the airbag 10H having a large area and a complicated shape can be made by the panels having a relatively small area without loss.

According to the embodiment, since the seam allowance 114 is provided with the opening 120 for reversing the airbag product during the process of manufacturing the airbag as described above, the airbag intermediate product can be easily turned inside out even when the inflator opening is shaped like a slit as in the embodiment. Since the opening 120 is closed with the seam 100 when the joint allowances 116 and 117 are stitched together, the gas introduced from the inflator 71 into the right half airbag 12H and the left half airbag 14H does not leak from the opening 120. When the inflator opening is shaped like a slit, the inflator is strongly connected to the airbag.

Figure 18A:
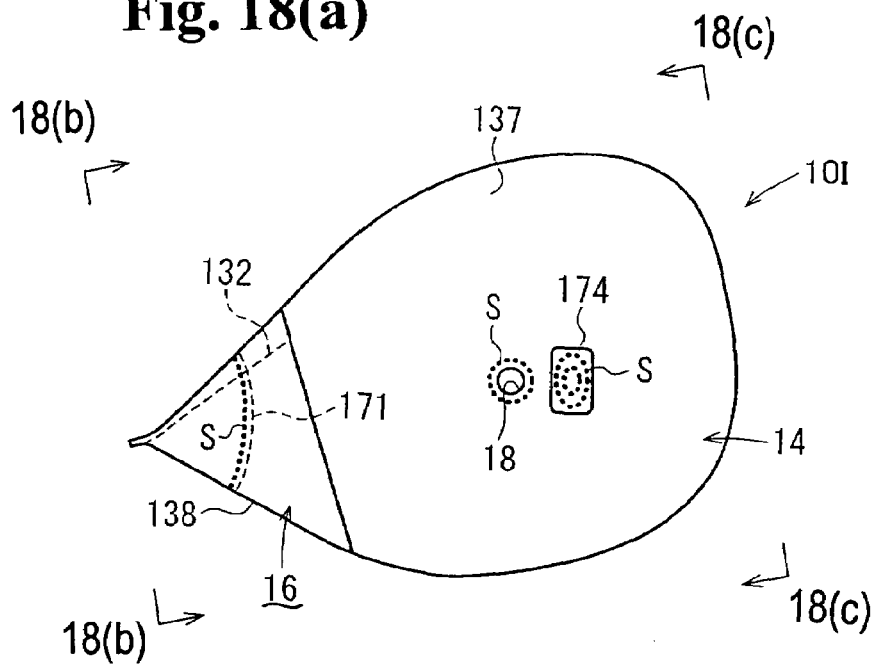
Figure 18B:
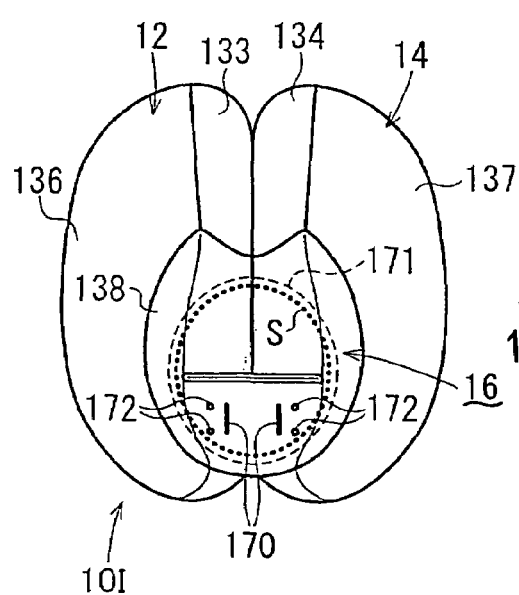
Figure 18C:
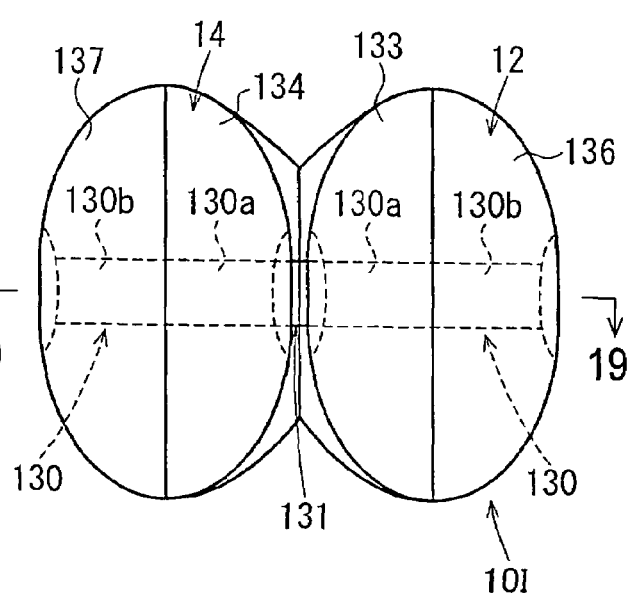
Figure 19:
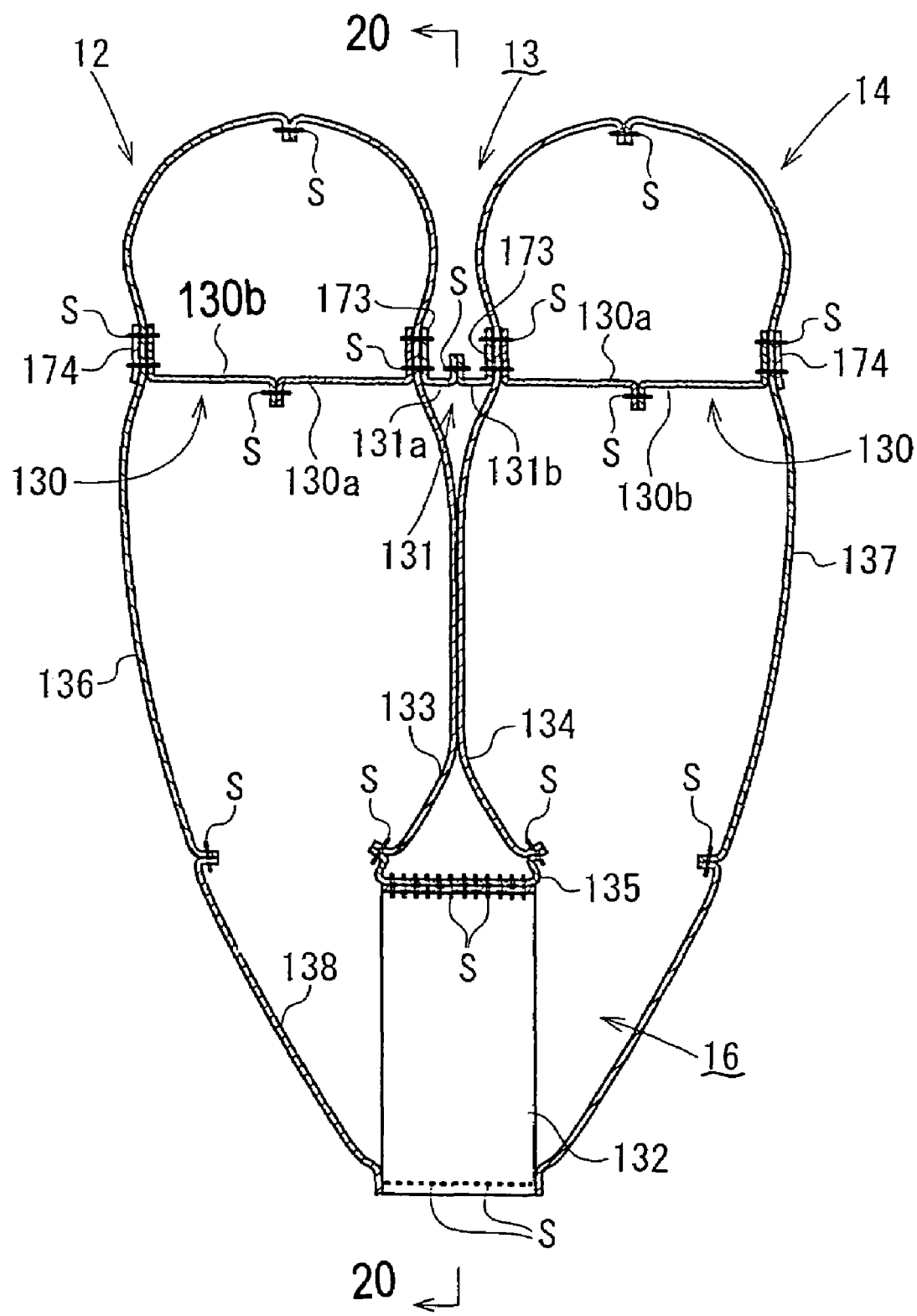
FIG. 19 is a sectional view taken along line 19-19 in FIG. 18(c)
Figure 20:
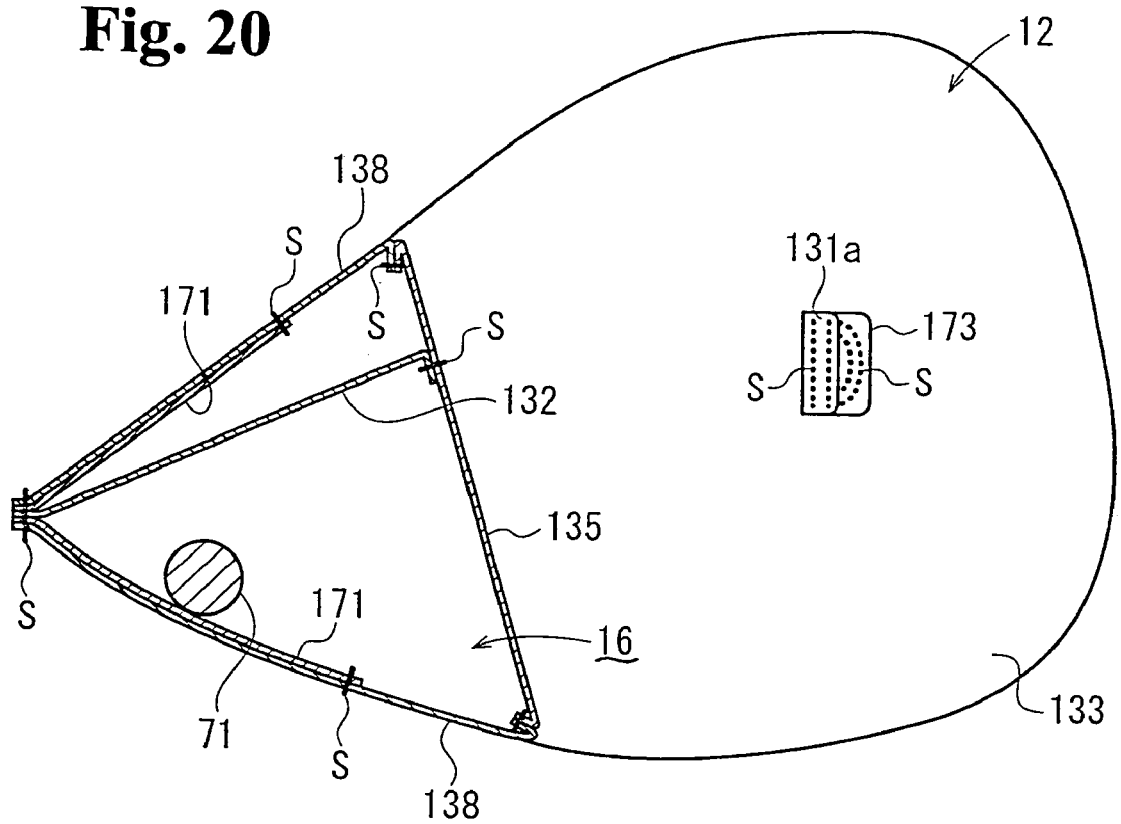
FIG. 20 is a sectional view taken along line 20-20 of FIG. 19.
Figure 21A:
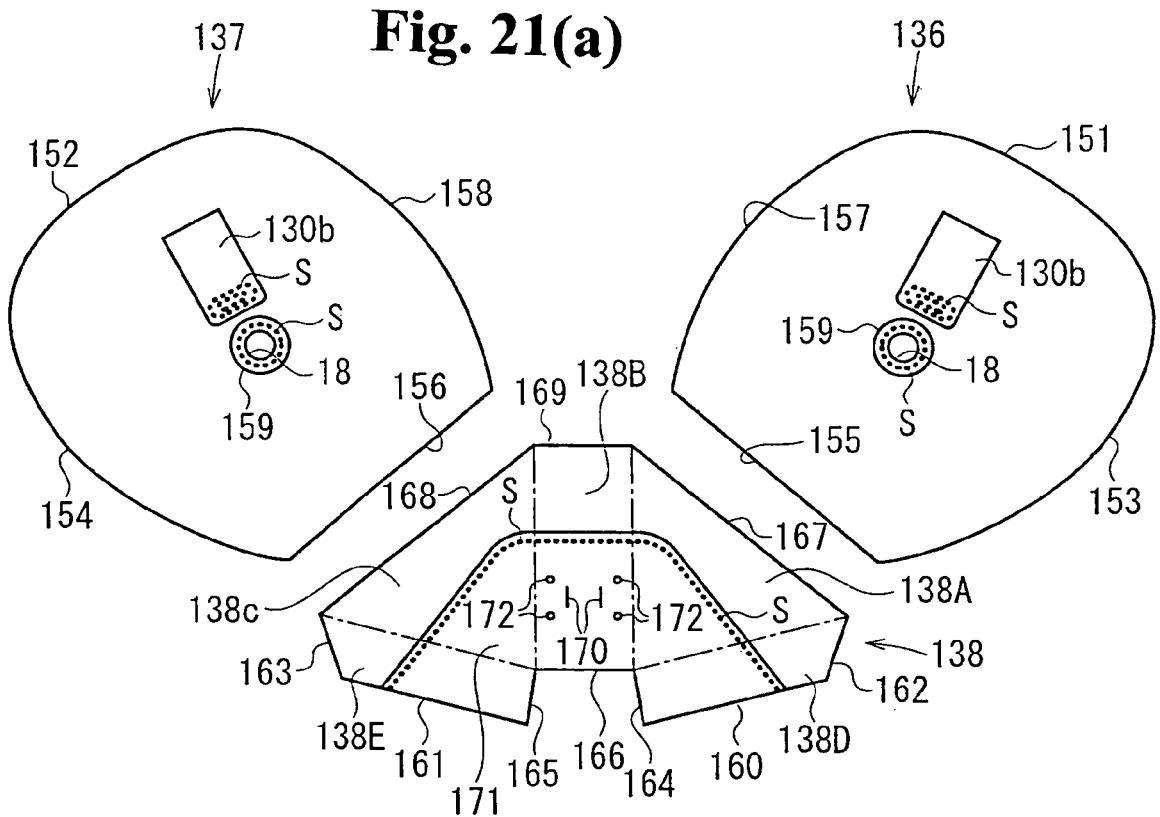
FIGS. 21(a) and 21(b) are exploded views of the airbag shown in FIGS. 18(a)-18(c)
Figure 21B:
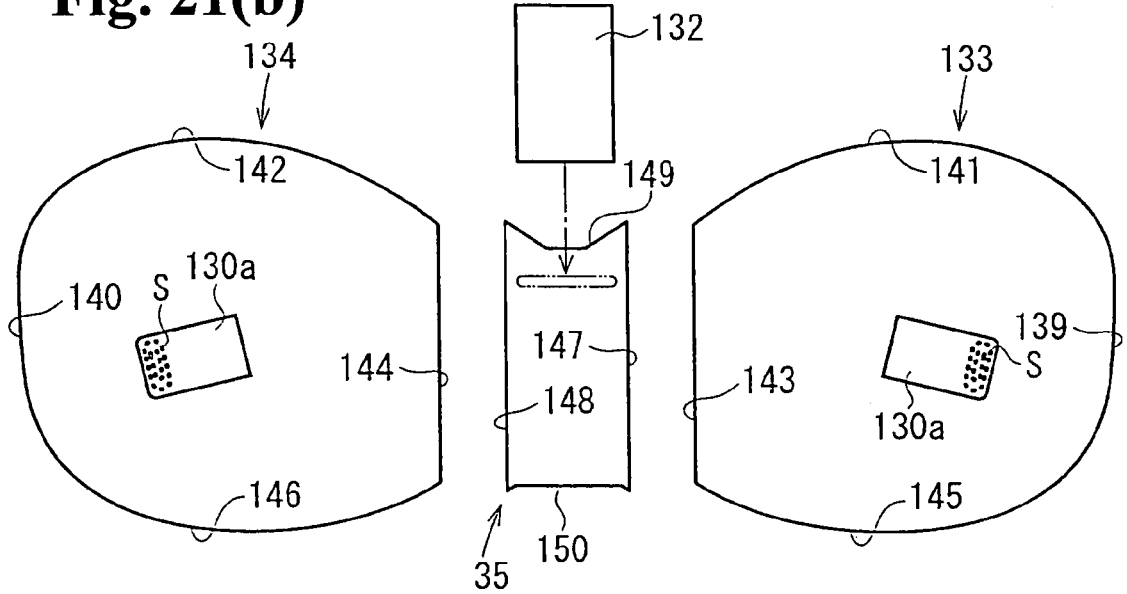

FIG. 18(a) is a side view of an airbag 10I according to a still further embodiment; FIG. 18(b) is a view seen along line 18(b)-18(b) in FIG. 18(a); and FIG. 18(c) is a view seen along line 18(c)-18(c) in FIG. 18(a). FIG. 19 is a sectional view taken along line 19-19 in FIG. 18(c). FIG. 20 is a sectional view taken along line 20-20 in FIG. 19. FIGS. 21(a) and 21(b) are exploded views (plan views) of a panel structure of the airbag 10I.

In the airbag 10I, the right half airbag 12 and the left half airbag 14 have width restricting belts 130 for restricting lateral widths of the half airbags 12 and 14 during the inflation, respectively. Opposing surfaces (later-described inner panels 133 and 134) at the midsections of the half airbags 12 and 14 in the inflating direction are joined together with a connecting belt 131. In this embodiment, a tether 132 is provided for connecting the deepest part (later-described intermediate panel 135) of the pocket between the right half airbag 12 and the left half airbag 14 to the base end of the base-end chamber 16 (rear side 166 of a later-described base-end panel 138).

In the airbag 10I, an outer shell thereof is constructed of a total of six panels, namely a right inner panel 133, a left inner panel 134, an intermediate panel 135 connecting the panels 133 and 134, a right outer panel 136, a left outer panel 137, and the base-end panel 138. The right inner panel 133 corresponds to a right side 20R of the inner panel 20 of the airbag 10 (see FIGS. 1 to 4) and constructs the inner surface of the right half airbag 12. The left inner panel 134 corresponds to a left side 20L of the inner panel 20 and constructs the inner surface of the left half airbag 14. The intermediate panel 135 corresponds to a turning part in the vicinity of the lateral middle of the inner panel 20 and constructs the deepest pocket between the right half airbag 12 and the left half airbag 14.

Referring to FIG. 21(b), peripheral edges of the right inner panel 133 and the left inner panel 134 are constructed of distal ends 139 and 140, upper sides 141 and 142, linear rear sides 143 and 144, and lower sides 145 and 146, respectively. A peripheral edge of the intermediate panel 135 is constructed of a pair of sides 147 and 148 and an upper side 149 and a lower side 150 that connect the respective upper ends and lower ends together, respectively.

Referring to FIG. 21(a), peripheral edges of the right outer panel 136 and the left outer panel 137 are constructed of distal ends 151 and 152, upper sides 153 and 154, linear rear sides 155 and 156, and lower sides 157 and 158, respectively. The right outer panel 136 constructs an outer surface of the right half airbag 12, while the left outer panel 137 constructs an outer surface of the left half airbag 14. Each of the outer panels 136 and 137 has the vent hole 18. Reference numeral 159 denotes a reinforcing cloth stitched to the periphery of the vent hole 18. Symbol S indicates the seam of the stitching.

In this embodiment, all of the right inner panel 133, the left inner panel 134, the right outer panel 136, and the left outer panel 137 are made of a base cloth cut into the same outline (outer shape). The right inner panel 133 and the right outer panel 136 and the left inner panel 134 and the left outer panel 137 are, coated with a synthetic resin or the like at the opposing surfaces (inside surfaces in the airbag product). They have substantially the same shape and an inverse relationship in which the front and the rear are opposite, as left and right hands.

As shown in FIG. 21(a), the base-end panel 138 has a right side surface 138A, a bottom surface 138B, a left side surface 138C, a right flap 138D constructing an upper right side, and a left flap 138E constructing an upper left side. The base-end panel 138 is bent so that the side surfaces 138A and 138C become substantially rectangular and has a surface open to the distal end of the airbag.

An entire periphery of the base-end-panel 138 is constructed of the respective opposing sides 160 and 161 of almost rectangular flaps 138D and 138E, the respective front sides (flap front sides) 162 and 163 of the flaps 138D and 138E, the respective rear sides 164 and 165 of the flaps 138D and 138E, a rear side 166 opposite to the rear sides 164 and 165, the respective front sides (side front sides) 167 and 168 of the side surfaces 138A and 138C, and a bottom front side 169 connecting the side front sides 167 and 138.

In this embodiment, all of the sides 160 to 169 are linear. The bottom surface 138B has a pair of slits 170 for the rod inflator 71 to pass therethrough. To the surfaces of the base-end panel 138, i.e. the inside surfaces of the airbag product (hereinafter, referred to as "inner surfaces" of the panels), a reinforcing (heat-resisting) cloth 171 is stitched from the bottom surface 138B through the right and left side surfaces 138A and 138C and the flaps 138D and 138E. Reference numeral 172 indicates a hole for a fastener (not shown) such as a bolt to pass therethrough for joining the bottom surface 138B to the casing (not shown) of the airbag system.

Each of the width restricting belts 130 is made of a pair of half belt sections 130a and 138b. Referring to FIG. 19, ends of the half belt sections 130a are stitched to the inner surfaces of the inner panels 133 and 134. Reinforcing clothes 173 are arranged at sides opposite to the ends of the half belt sections 130a (on the side adjacent to the outer surface of the-panel, the same is applied to the following) with the inner panels 133 and 134 in between, and stitched to the inner surfaces and the ends of the half belt sections 130a. Ends of the half belt sections 130b are stitched to the inner surfaces of the outer panels 136 and 137. Reinforcing clothes 174 are arranged at sides opposite to the ends of the half belt sections 130b with the outer panels 136 and 137 sandwiched therebetween, and stitched to the inner surfaces and the ends of the half belt sections 130b.

The other ends of the half belt sections 130a and 130b are stitched together, so that the right inner panel 133 and the right outer panel 136, and the left inner panel 134 and the left outer panel 137 are joined together with the half belt sections 130a and 130b, respectively, thereby restricting the separation during the inflation of the airbag (width of the right half airbag 12 and the left half airbag 14 during the inflation).

In this embodiment, the connecting belt 131 is also constructed of a pair of half belt sections 131a and 131b. Referring to FIG. 19, ends of the half belt sections 131a and 131b are connected to the reinforcing clothes 173 stitched to the surfaces of the inner panels 133 and 134, respectively. The other ends of the half belt sections 131a and 131b are stitched together, so that the inner panels 133 and 134 are joined together through the half belt sections 131a and 131b, respectively. Thus, the midsections of the right half airbag 12 and the left half airbag 14 in the inflating direction are joined together.

When the 10I is produced, the rear side 143 of the right inner panel 133 and the rear side 144 of the left inner panel 134 are stitched to the sides 147 and 148 of the flat-spread intermediate panel 135, respectively. The end of the half belt section 130a and the reinforcing cloth 173 are stitched to each of the inner panels 133 and 134. An end of the tether 132 is stitched to the inner surface of the intermediate panel 135. The reinforcing cloth 159 is stitched to the periphery of the vent hole 18 in advance.

The rear side 155 of the right outer panel 136 and the rear side 156 of the left outer panel 137 are stitched to the side front sides 167 and 168 of the flat-spread base-end panel 138, respectively. The opposing sides 160 and 161 of the flaps 138D and 138E of the base-end panel 138 are then stitched together. The end of the half belt section 130b and the reinforcing cloth 174 are stitched to each of the outer panels 136 and 137.

The right outer panel 136 and the right inner panel 133 are opposed so that the outer surfaces thereof face each other when the airbag product is completed. The end distal sides 139 and 151, the upper sides 141 and 153, and the lower sides 145 and 157 are stitched together. The left outer panel 137 and the left inner panel 134 are opposed, and the distal sides 140 and 152, the upper sides 142 and 154, and the lower sides 146 and 158 are stitched together. The flap front sides 162 and 163 of the base-end panel 138 are stitched to the upper side 149 of the intermediate panel 135. The bottom front, side 169 of the base-end panel 138 is stitched to the lower side 150 of the intermediate panel 135.

When these panels are stitched, the 10I is in a reversed state and the seam allowance is exposed to the surface of the airbag. At this time, the flap rear sides 164 and 165 and the rear side 166 of the base-end panel 138 are not stitched, and are opened. The other end of the half belt section 130a attached to the right inner panel 133 and the other end of the half belt section 130b attached to the right outer panel 136 are stitched together. The other end of the half belt section 130a attached to the left inner panel 134 and the other end of the half belt section 130b attached to the left outer panel 137 are stitched together. Thereafter, the airbag is turned inside out through the opening. Then, the opening is stitched with the other end of the tether 132 inserted therein. The half belt sections 131a and 131b of the connecting belt 131 attached to the inner panels 133 and 134 are stitched together through the reinforcing cloth 173, thus completing the airbag 10I.

In this embodiment, all of the inner panels 133 and 134 and the outer panels 136 and 137 that construct the outer shell of the right half airbag 12 and the left half airbag 14 are made of a base cloth having the same outline. Therefore, the base cloth can be made with the same cutting equipment, thereby making the process efficient. Also, all of the sides 160 to 169 that construct the entire periphery of the base-end panel 138 are linear. Accordingly, the stitching of the panels can be straight when the airbag 10I is stitched, thereby making the process efficient.

In the airbag 10I, the lateral widths of the right half airbag 12 and the left half airbag 14 are restricted by the width restricting belts 130 during the inflation. Accordingly, the internal volumes of the right half airbag 12 and the left half airbag 14 are relatively small. Therefore, the right half airbag 12 and the left half airbag 14 can be inflated sufficiently early even with the inflator 71 having a small capacity.

In the airbag 10I, the right half airbag 12 and the left half airbag 14 are joined together through the connecting belt 131. Accordingly, when one of the right half airbag 12 and the left half airbag 14 is inflated earlier than the other, the one half airbag pulls the other half airbag to facilitate the inflation. The right half airbag 12 and the left half airbag 14 are joined together at the midsections thereof in the inflating direction. Accordingly, the one half airbag starts pulling the other half airbag in the inflating direction at a relatively early stage of the inflation. Accordingly, both the right half airbag 12 and the left half airbag 14 are inflated smoothly and laterally equally from the beginning of the inflation.

In the airbag 10I, the intermediate panel 135 that constructs the deepest pocket between the right half airbag 12 and the left half airbag 14 is connected to the rear side 166 of the base-end panel 138 through the tether 132. Accordingly, the pocket between the inflated right half airbag 12 and left half airbag 14 can be made deep.

Figure 22A:
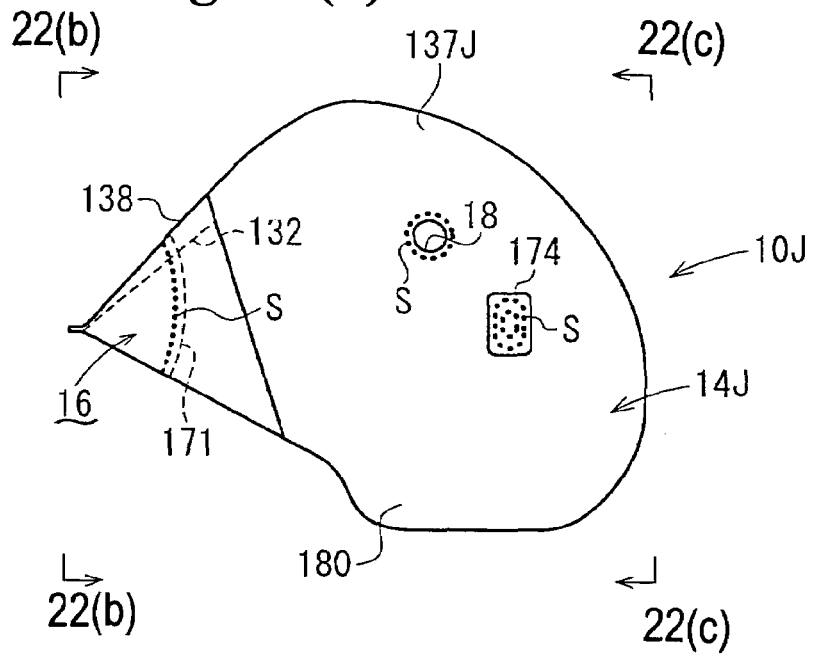
Figure 22B:
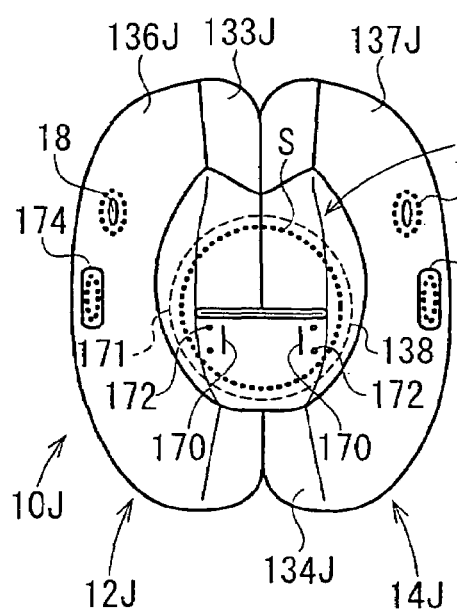
Figure 22C:
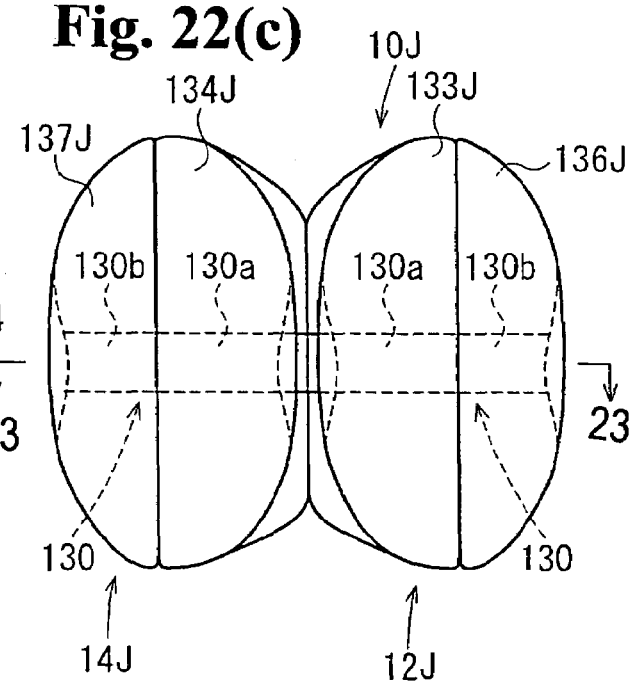
Figure 23:
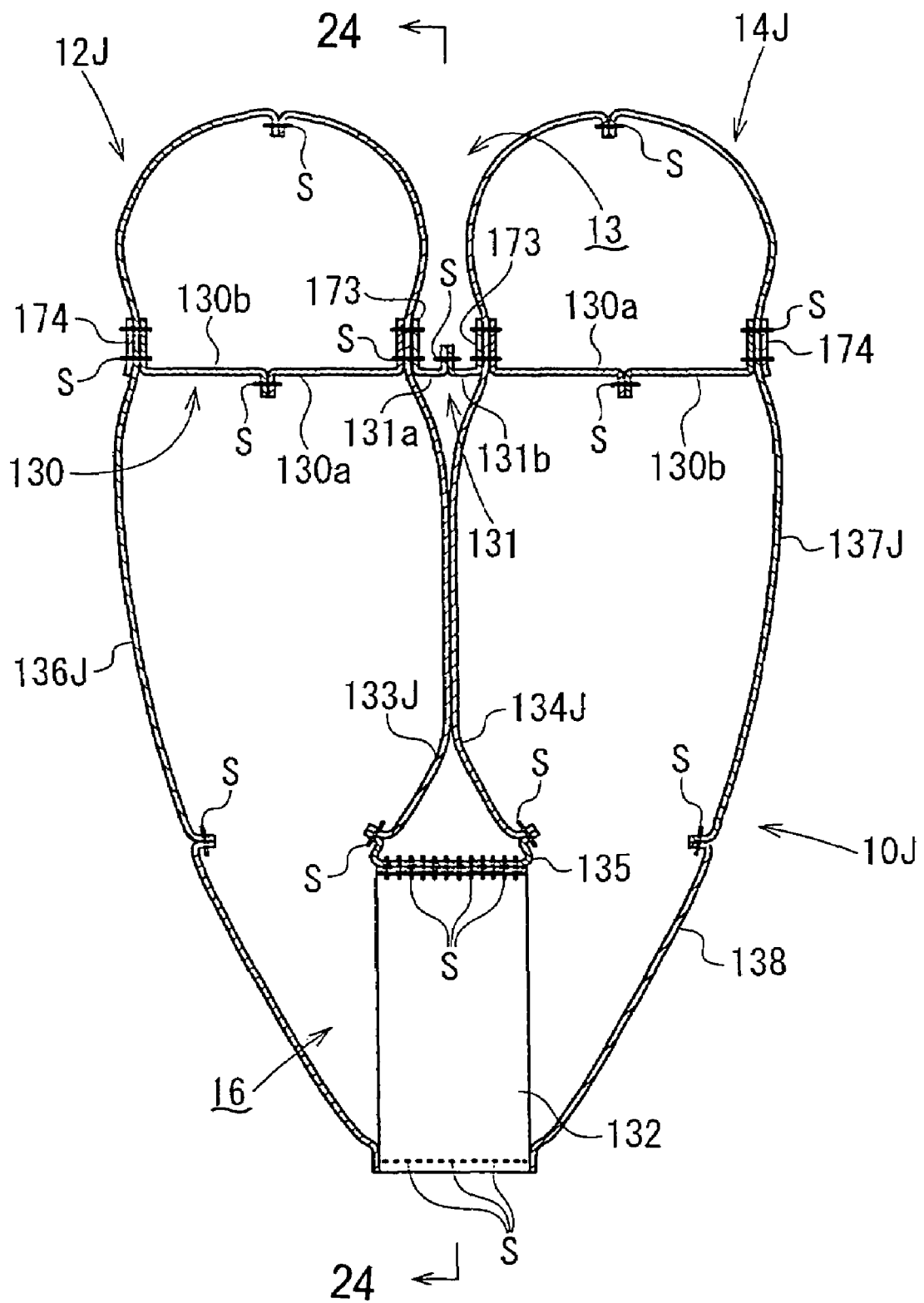
FIG. 23 is a sectional view taken along line 23-23 in FIG. 22(c)

FIG. 22(a) is a side view of an airbag 10J according to a still further embodiment; FIG. 22(b) is a view seen along line 22(b)-22(b) in FIG. 22(a); and FIG. 22(c) is a view seen along line 22(c)-22(c) in FIG. 22(a). FIG. 23 is a sectional view taken along line 23-23 in FIG. 22(c). FIG. 24 is a sectional view taken along line 24-24 in FIG. 23. FIGS. 25(a) and 25(b) are exploded views of a structure of the airbag 10J shown in FIGS. 22(a)-22(c).

In the airbag 10J, as shown in FIG. 22(a), a flared section 180 that protrudes downwardly is provided at each lower part of a right half airbag 12J and left half airbag 14J. An amount of inflation toward the occupant (rear side of the car) is small at upper parts of the right half airbag 12J and the left half airbag 14J. In other words, when the airbag 10J is inflated, distal ends of the right half airbag 12J and the left half airbag 14J bend downwardly. Therefore, as shown in FIGS. 25(a) and 25(b), inner panels 133J and 134J that construct inner surfaces of the airbag sections 12J and 14J and outer panels 136J and 137J that construct outer surfaces have respective lower sides 145, 146, 157, and 158 protruding downwardly and respective distal sides 139, 140, 151, and 152 inclined toward the front side of the car (leftward in FIG. 22(a)) so as to be away from the occupant upwardly.

Other arrangements of the airbag 10J are substantially the same as those of the airbag 10I shown in FIGS. 18(a) to 21(b), and reference numerals in FIGS. 22(a) to 25(b) same as those in FIGS. 18(a) to 21(b) indicate substantially the same components.

In the airbag 10J with such an arrangement, the right half airbag 12J and the left half airbag 14J are inflated downwardly below a head of the occupant. Accordingly, the airbag is preferable as an airbag for receiving the occupant from the stomach through the chest (lower than the head) upon a car crash.

Figure 26A:
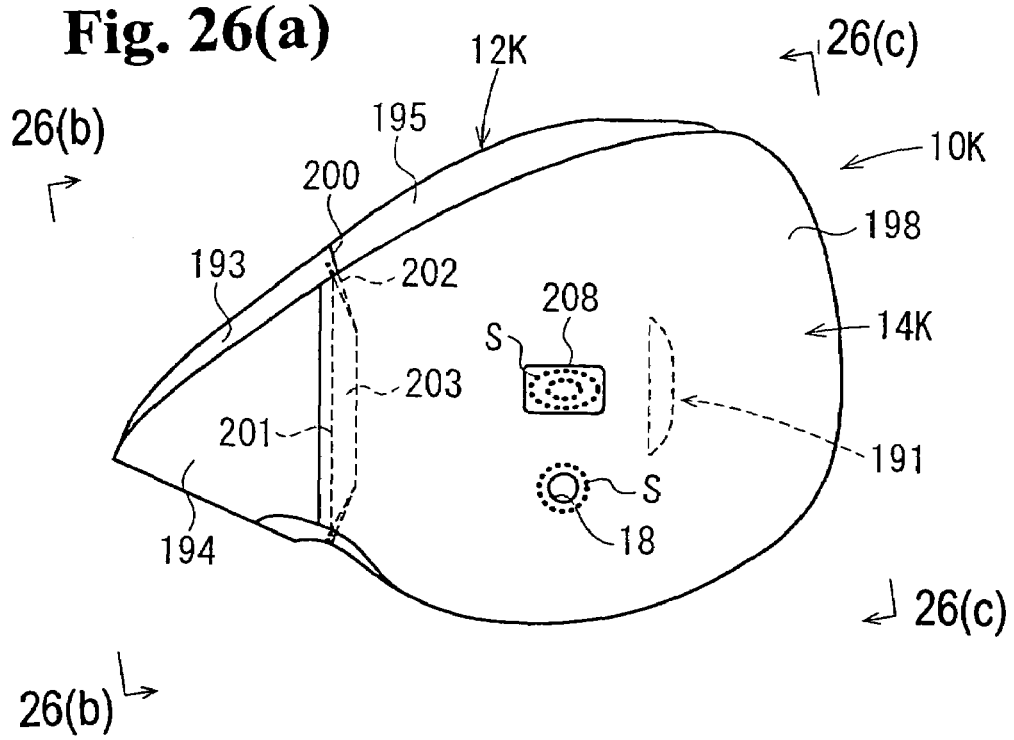
Figure 26B:
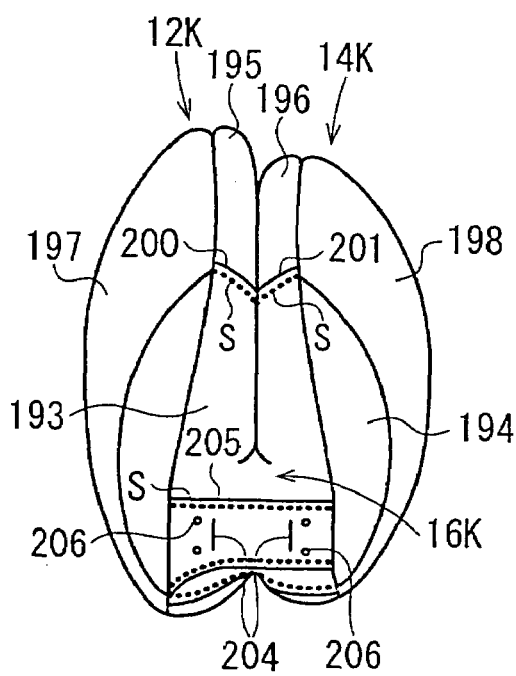
Figure 26C:
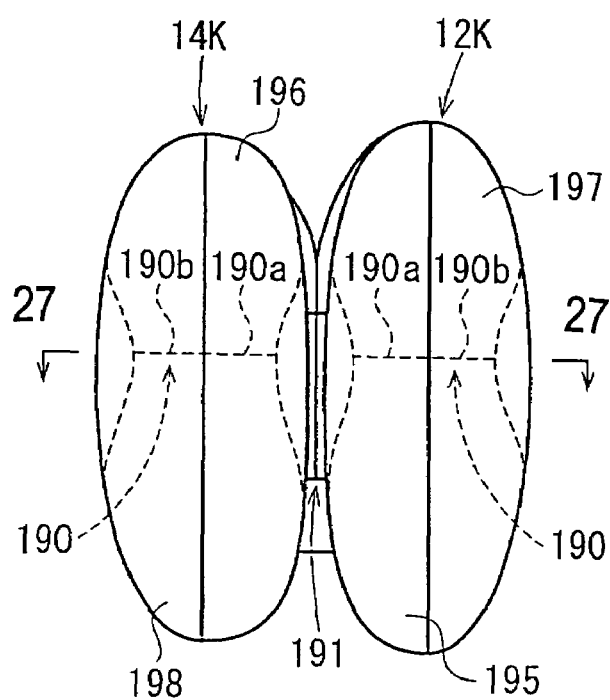
Figure 27:
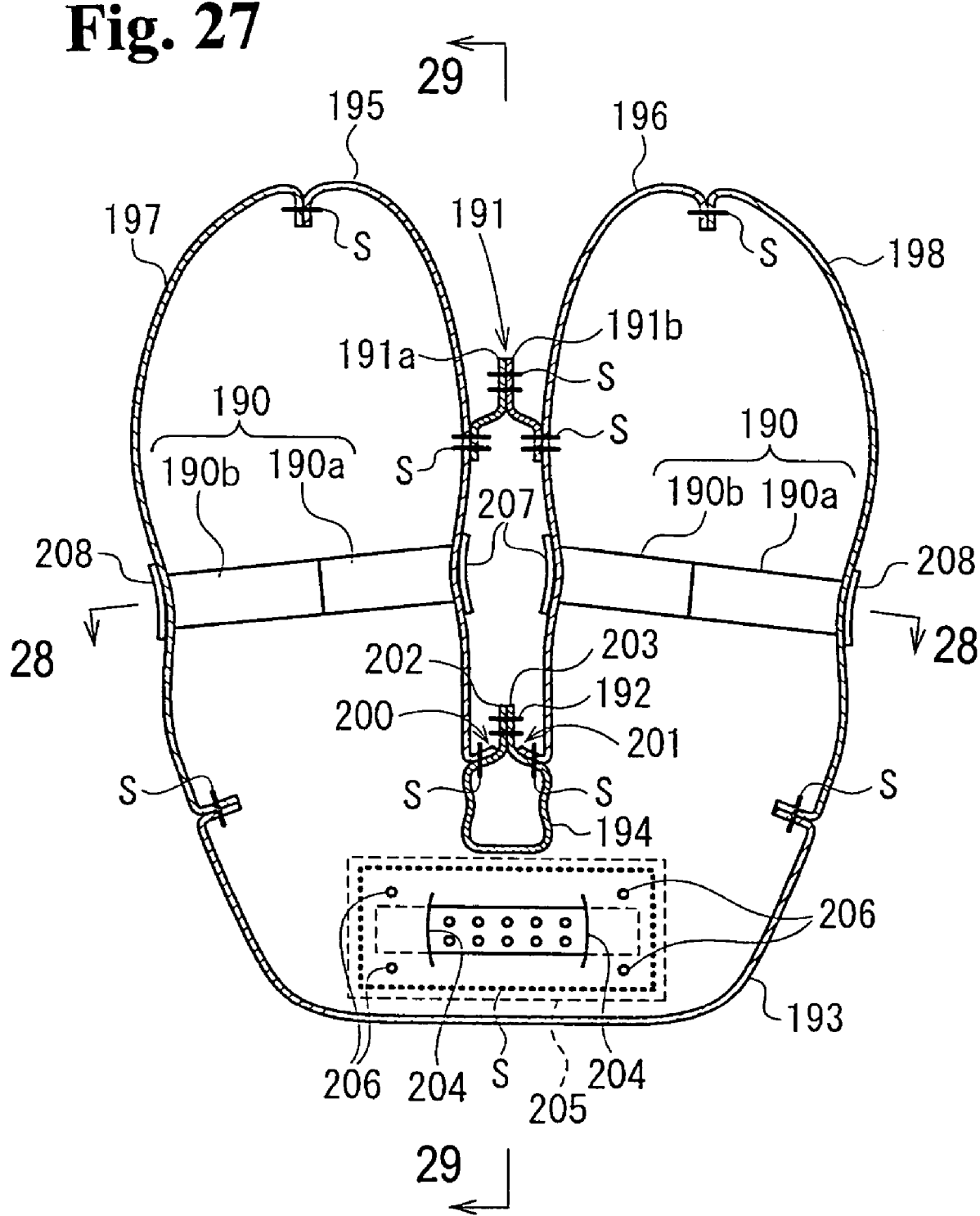
FIG. 27 is a sectional view taken along line 27-27 in FIG. 26(c)
Figure 28:
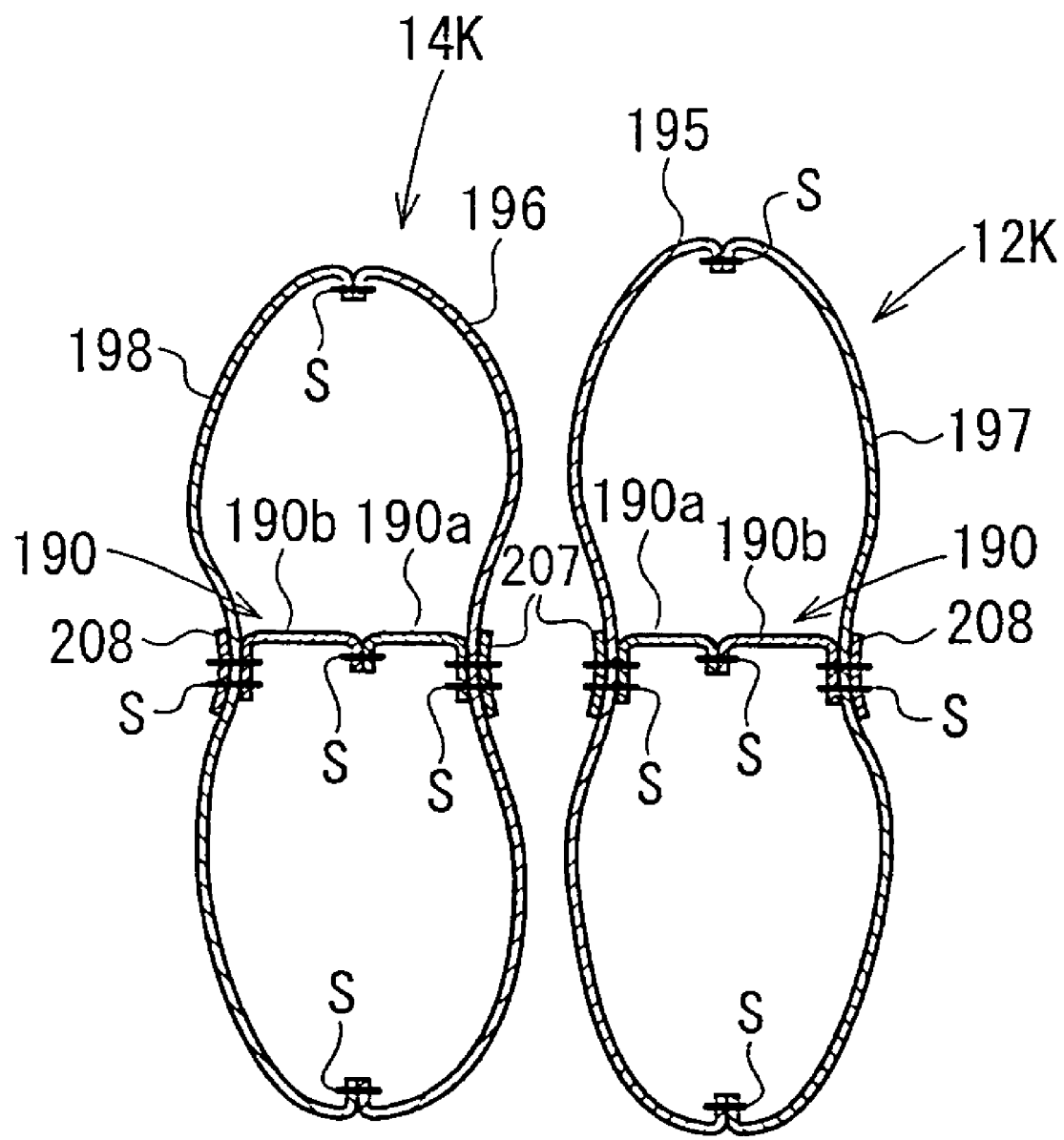
FIG. 28 is a sectional view taken along line 28-28 in FIG. 27.
Figure 29:
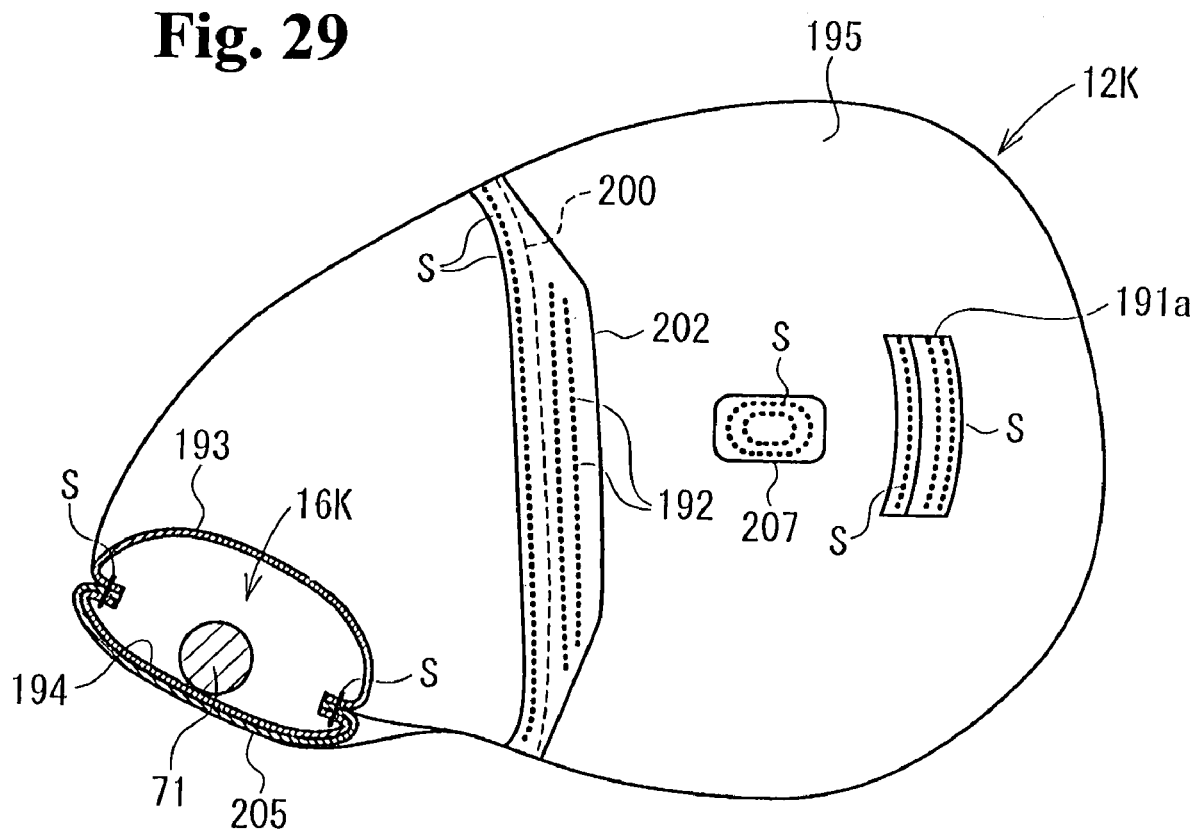
FIG. 29 is a sectional view taken along line 29-29 in FIG. 27.
Figure 30:
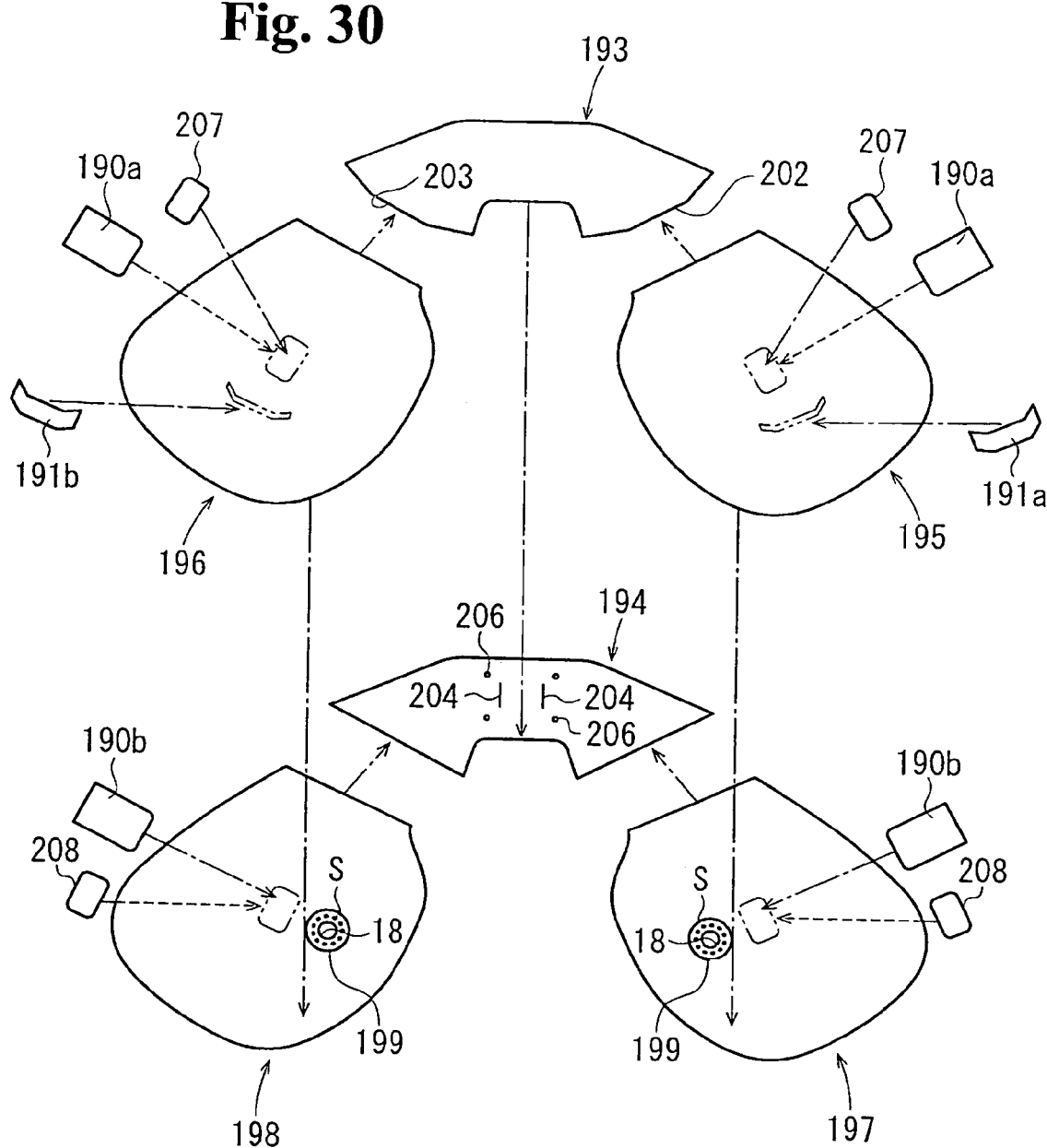
FIG. 30 is an exploded view of the airbag shown in FIGS. 26(a)-26(c).

FIGS. 26(a) to 26(c) are views showing an airbag 10K according to a still further embodiment, wherein FIG. 26(a) is a side view of the airbag, FIG. 26(b) is a view seen along line 26(b)-26(b) in FIG. 26(a); and FIG. 26(c) is a view seen along line 26(c)-26(c) in FIG. 26(a). FIG. 27 is a sectional view taken along line 27-27 in FIG. 26(c). FIG. 28 is a sectional view taken along line 28-28 in FIG. 27. FIG. 29 is a sectional view taken along line 29-29 in FIG. 27. FIG. 30 is an exploded view (plan view) of the airbag 10K shown in FIGS. 26(a)-26(c).

In the airbag 10K, a right half airbag 12K is arranged at the center of the vehicle cabin (center side) and a left half airbag 14K is arranged at a side adjacent to a side door (A-pillar side). Referring to FIGS. 26(a)-26(c), the airbag 10K is constructed such that an upper part of the left half airbag 14K. is located below an upper part of the right half airbag 12K in an inflated state. Accordingly, it is possible to prevent the left half airbag 14K from interfering with the A-pillar (not shown), thereby stabilizing an inflated shape of the airbag 10K.

In the airbag 10K, a base-end chamber 16k has a cylindrical shape extending laterally so that base ends of the right half airbag 12K and the left half airbag 14K communicate with each other, as in the airbag 1OH shown in FIGS. 14(a) to 17 (see FIG. 29). The airbag 10K includes a width restricting belt 190 in each of the right half airbag 12K and the left half airbag 14K for restricting lateral widths of the right half airbag 12K and the left half airbag 14K during the inflation.

In the airbag 10K, opposing surfaces (later-described front inner panels 195 and 196) of the right half airbag 12k and the left half airbag 14K are connected at two positions closer to the distal end and the base end relative to the width restricting belt 190 in the inflating direction. The opposing surfaces of the airbag sections 12k and 14K are joined together with a connecting belt 191 at a position closer to the distal end relative to the width restricting belt 190. The opposing surfaces of the airbag sections 12k and 14K are also joined (connected) with a seam (stitching thread) 192 at a position closer to the base end relative to the width restricting belt 190.

In the embodiment, the outer shell of the airbag 10K is formed of panels 193, 194, 195, 196, 197, and 198 by stitching together. The panel 193 (rear inner panel) constructs surfaces of the right half airbag 12K and the left half airbag 14K from midsections to base ends thereof in the inflating direction and a surface of the base-end chamber 16K at the center of the airbag. The panel 194 (rear outer panel) constructs a surface (airbag outer surface) opposite to the rear inner panel 193.

The panels 195 and 196 (front inner panels) construct surfaces of the right half airbag 12K and the left half airbag 14K from the midsections to the distal ends in the inflating direction, and surfaces at the center of the airbag (opposing surfaces of the right half airbag 12K and the left half airbag 14K).

The panels 197 and 198 (front outer panel) construct surfaces (outer surface of the airbag) opposite to the front inner panels 195 and 196. In this embodiment, the opposing front inner panel 195 and front outer panel 197, and the opposing front inner panel 196 and front outer panel 198 are made of a base cloth cut into the same outline. Symbol S indicates the seam of stitching. Each of the front outer panels 197 and 198 has the vent hole 18. Reference numeral 199 indicates a reinforcing cloth stitched to a periphery of the vent hole 18.

Referring to FIGS. 26(a) and 29, seam allowances (joint allowances) 200 and 201 of the rear inner panel 193 and the front inner panels 195 and 196 are arranged to be exposed to the outer surfaces of the right half airbag 12K and the left half airbag 14K in the airbag product, respectively. As shown in FIGS. 27 and 29, tongue-shaped joint allowances 202 and 203 (only joint allowance 202 is shown in FIG. 29) project from the seam allowances 200 and 201, respectively. As clearly shown in FIG. 27, the joint allowances 202 and 203 are stitched together with a seam 192.

As described above, the right half airbag 12K and the left half airbag 14K are joined together at the midsections of the opposing surfaces in the inflating direction with the seam allowances 200 and 201 of the rear inner panel 193 and the front inner panels 195 and 196.

The rear outer panel 194 is provided with a pair of slits 204 for the rod inflator 71 to pass therethrough. The rear outer panel 194 has a reinforcing (heat-resisting) cloth 205 stitched thereto. Reference numeral 206 denotes a hole for a fastener (not shown) such as a bolt to pass therethrough for connecting the rear outer panel 194 to the casing (not shown) of the airbag system.

In this embodiment, each of the width restricting belts 190 is made of a pair of half belt sections 190a and 190b. Referring to FIG. 28, ends of the half belt section 190a are stitched to the inner surfaces of the front inner panels 195 and 196. A reinforcing cloth 207 is arranged at a side opposite to each of the ends of the half belt sections 190a (on the outer surface of the panel) with the front inner panels 195 and 196 sandwiched therebetween, and stitched together. Ends of the other half belt sections 190b are stitched to the inner surfaces of the outer panels 197 and 198. A reinforcing cloth 208 is arranged at a side opposite to each of the ends of the half belt sections 130b with the outer panels 197 and 198 sandwiched therebetween, and stitched together. Other ends of the half belt sections 190a and 190b are stitched together, so that the front inner panel 195 and the front outer panel 197 and also the front inner panel 196 and the front outer panel 198 are joined together with the half belt sections 190a and 190b, respectively, thereby restricting the separation thereof during the inflation of the airbag (widths of the right half airbag 12K and the left half airbag 14K during the inflation).

The connecting belt 191 is also constructed of a pair of half belt sections 191a and 191b. Referring to FIG. 28, ends of the half belt sections 191a and 191b are stitched to the outer surfaces of the front inner panels 195 and 196, respectively, and the other ends are stitched together, so that the front inner panels 195 and 196 are joined together through the half belt sections 191a and 191b, respectively. Thus, the right half airbag 12K and the left half airbag 14K are joined together.

In this embodiment, the front inner panel 195 and the front outer panel 197 of the right half airbag 12K, and the front inner panel 196 and the front outer panel 198 of the left half airbag 14k are each made of a base cloth having the same outline. Therefore, the base cloth can be made with the same cutting equipment, thereby making the process efficient.

In the airbag 10K, the lateral widths of the right half airbag 12K and the left half airbag 14K during the inflation are restricted by the width restricting belts 190. Accordingly, the internal volumes of the right half airbag 12K and the left half airbag 14K are relatively small. Therefore, the right half airbag 12K and the left half airbag 14K can be inflated sufficiently early even with the inflator 71 having a small capacity.

In the airbag 10K, the right half airbag 12K and the left half airbag 14K are joined together through the connecting belt 191 and the seam 192. Accordingly, when one of the right half airbag 12K and the left half airbag 14K is inflated faster than the other, the one half airbag pulls the other half airbag to facilitate the inflation. Moreover, since the right half airbag 12K and the left half airbag 14K are joined together at the midsections thereof in the inflating direction, the one half airbag starts pulling the other half airbag in the inflating direction at a relatively early stage of the inflation. Accordingly, both the right half airbag 12K and the left half airbag 14K are inflated smoothly and laterally equally from the beginning of the inflation.

While the invention has been explained with reference to the specific embodiments of the invention, the explanation is illustrative and the invention is limited only by the appended claims.

What is claimed is:

1. An airbag for protecting an occupant, comprising:
   a left half airbag to be inflated on a front left side of the occupant, and having a front end,
   a right half airbag to be inflated on a front right side of the occupant, and having a front end, said right half airbag being spaced from the left half airbag with an atmosphere therebetween when inflated, and
   a base-end chamber attached to each rear end portion of the left and right half airbags to communicate therewith,
   wherein said airbag consists essentially of one inner panel, one left outer panel portion, one right outer panel portion and one base-end panel, respectively formed separately and connected together:
   said one inner panel having upper and lower edges and extending from the front end of the left half airbag to the front end of the right half airbag while forming inner surfaces of the left and right half airbags facing each other,
   said left outer panel portion forming an outer surface of the left half airbag,
   said right outer panel portion forming an outer surface of the right half airbag, and
   said one base-end panel forming the base-end chamber for the left and right half airbags so that the left and right half airbags are inflated with gas passing through the base-end chamber.

2. An airbag according to claim 1, wherein said upper edge of the inner panel is connected to upper edges of the left and right outer panel portions; said lower edge of the inner panel is connected to lower edges of the left and right outer panel portions; respective front edges of the left and right outer panel portions are connected to front edges of the inner panel; and said base-end panel is connected to rear edges of the left and right outer panel portions, and the upper and lower edges at a rear end of the inner panel.

3. An airbag according to claim 1, further comprising a tether for connecting a rear end of the inner panel with a base end of the base-end panel.

4. An airbag according to claim 1, further comprising a gasbag disposed in the base-end chamber for receiving gas from an inflator, said gasbag having openings for discharging the gas from the base-end chamber into the left half airbag and the right half airbag.

5. An airbag according claim 1, wherein said front ends of the left and right half airbags are spaced apart from each other without connection when the airbag is inflated so that a space facing the occupant is formed between the front ends of the left and right half airbags.

6. An airbag according to claim 5, wherein said front ends of the left and right half airbags are spaced apart by a distance from 150 mm to 450 mm when the airbag is inflated, and said front ends of the left and right half airbags are located away from a deepest part of the space by a horizontal distance from 280 mm to 480 mm when the airbag is inflated.

7. An airbag according to claim 1, further comprising width restricting devices disposed in the left and right half airbags, respectively, for restricting lateral widths of the left and right half airbags when the airbag is inflated.

8. An airbag according to claim 1, further comprising a connecting device disposed between the left and right half airbags for connecting the left and right half airbags.

9. An airbag system comprising the airbag according to claim 1 and an inflator disposed in the base end chamber of the airbag for inflating the airbag.

10. A vehicle comprising the airbag system according to claim 9.

11. A vehicle according to claim 10, wherein said airbag system is mounted on an instrument panel in front of a passenger seat of the vehicle such that a rear end of the base-end chamber of the airbag is located closer to a front side of the vehicle than a rear end of the instrument panel in a front-to-rear direction of the vehicle when the airbag is inflated.

12. An airbag according to claim 1, consisting of said left and right half airbags, and said base-end chamber communicating with said left and right half airbags at the rear end portions thereof.

13. An airbag according to claim 1, wherein said left and right half airbags have an elongated shape extending outwardly from the base-end chamber, and are arranged side by side without the gas for inflating the left and right half airbags in between.

14. An airbag for protecting an occupant, comprising:
    a left half airbag to be inflated on a front left side of the occupant, and having a front end,
    a right half airbag to be inflated on a front right side of the occupant, and having a front end, said right half airbag being spaced from the left half airbag with an atmosphere therebetween when inflated, and
    a base-end chamber attached to each rear end portion of the left and right half airbags to communicate therewith,
    wherein said airbag comprises:
    an inner panel having upper and lower edges and extending from the front end of the left half airbag to the front end of the right half airbag while forming inner surfaces of the left and right half airbags facing each other,
    a left outer panel portion for forming an outer surface of the left half airbag,
    a right outer panel portion for forming an outer surface of the right half airbag, and
    a base-end panel for forming the base-end chamber for the left and right half airbags so that the left and right half airbags are inflated with gas passing through the base-end chamber, said base-end panel having an elongated shape and comprising a center area forming a bottom of the base-end chamber, two triangular middle areas laterally outside the bottom for forming side surfaces of the base-end chamber, two end areas further laterally outside the middle areas for forming flaps at an upper portion of the base-end chamber, wherein said base-end panel are arranged such that the flaps are located above the bottom, are connected to the upper edge of the inner panel, are connected to the bottom at a side opposite to the inner panel, and are connected together at longitudinal edges of the base-end panel; the bottom is connected to the lower edge of the inner panel; and the side surfaces are connected to the left and right outer panel portions.

15. An airbag according to claim 14, further comprising a connection panel for connecting a rear edge of the left outer panel with a rear edge of the right outer panel to divide the left and right half airbags from the base-end chamber.

16. An airbag according to claim 14, further comprising a tether for connecting a rear end of the inner panel with a base end of the base-end panel, said tether being integrally formed with a connection panel for connecting a rear edge of the left outer panel portion with a rear edge of the right outer panel portion.

17. An airbag according to claim 14, wherein said upper edge of the inner panel is connected to upper edges of the left and right outer panel portions; said lower edge of the inner panel is connected to lower edges of the left and right outer panel portions; respective front edges of the left and right outer panel portions are connected to front edges of the inner panel.

18. An airbag according to claim 17, further comprising a tether connecting the inner panel and the bottom at a side away from the inner panel.

* * * * *